US011341443B2

(12) United States Patent
Chu et al.

(10) Patent No.: US 11,341,443 B2
(45) Date of Patent: May 24, 2022

(54) PRIORITIZING SEQUENTIAL APPLICATION TASKS

(71) Applicant: Citrix Systems, Inc., Fort Lauderdale, FL (US)

(72) Inventors: Xiaolu Chu, Nanjing (CN); Yuran Ou, Nanjing (CN); Zongpeng Qiao, Nanjing (CN); Tie Liu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/911,765

(22) Filed: Jun. 25, 2020

(65) Prior Publication Data

US 2021/0390486 A1    Dec. 16, 2021

Related U.S. Application Data

(63) Continuation of application No. PCT/CN2020/094065, filed on Jun. 3, 2020.

(51) Int. Cl.
*G06Q 10/06* (2012.01)
*G06F 9/455* (2018.01)
*G06F 9/48* (2006.01)

(52) U.S. Cl.
CPC ... *G06Q 10/06316* (2013.01); *G06F 9/45558* (2013.01); *G06F 9/4881* (2013.01);
(Continued)

(58) Field of Classification Search
CPC ...... G06Q 10/06316; G06Q 10/063114; G06F 9/45558; G06F 9/4881; G06F 2009/45595
See application file for complete search history.

(56) References Cited

U.S. PATENT DOCUMENTS

| 10,235,646 B2* | 3/2019 | Perry | G16H 40/67 |
| 2003/0004767 A1* | 1/2003 | Ohsaki | G06Q 10/10 |
| | | | 705/7.26 |

(Continued)

FOREIGN PATENT DOCUMENTS

| CN | 106775948 A1 | 5/2017 |
| CN | 106897136 A | 6/2017 |
| CN | 111090510 A | 5/2020 |

OTHER PUBLICATIONS

International Search Report and Written Opinion on PCT Appl. PCT/CN2020/094065 dated Mar. 10, 2021.

*Primary Examiner* — Romain Jeanty
(74) *Attorney, Agent, or Firm* — Foley & Lardner LLP

(57) ABSTRACT

Described embodiments provide systems, methods and computer implemented instructions for prioritizing sequential application tasks. A system receives, from an application, a sequence of tasks to be performed by users using clients. The system identifies a first user to perform a first task in the sequence of tasks, and a second user to perform a second task in the sequence of tasks that is subsequent to the first task. The system determines the state of a first client of the first user and a state of a second client of the second user. The system establishes a rank for the first task based on the states of the first client and the second client. The system provides, to the first client, the rank for the first task and the state of the second client. The system generates a graphical user interface indicating the rank and state of the second client.

20 Claims, 21 Drawing Sheets

(52) U.S. Cl.
 CPC ............... *G06Q 10/063114* (2013.01); *G06F 2009/45595* (2013.01)

(56) References Cited

U.S. PATENT DOCUMENTS

| | | | |
|---|---|---|---|
| 2010/0306020 A1* | 12/2010 | Lo ................... | G06Q 10/06316 705/7.27 |
| 2015/0073857 A1* | 3/2015 | Akita ................ | G06Q 10/087 705/7.26 |
| 2016/0078394 A1* | 3/2016 | Fuldner ............ | H04W 4/023 705/7.15 |
| 2017/0061357 A1* | 3/2017 | Dubey .............. | G06Q 40/12 |
| 2017/0195182 A1* | 7/2017 | Nair ................. | H04L 41/12 |
| 2018/0107965 A1* | 4/2018 | Namboothiri .. | G06Q 10/063112 |
| 2018/0189706 A1* | 7/2018 | Newhouse ...... | G06Q 10/06316 |
| 2019/0014206 A1* | 1/2019 | Kuhn ................ | A63F 13/216 |
| 2019/0102228 A1 | 4/2019 | Fuller et al. | |
| 2019/0138583 A1* | 5/2019 | Silk ................... | G06F 40/18 |
| 2019/0138638 A1* | 5/2019 | Pal .................... | G06F 9/4881 |
| 2019/0318291 A1* | 10/2019 | Diriye ............... | H04L 41/147 |
| 2020/0065736 A1* | 2/2020 | Relangi ............ | G06Q 10/0639 |

\* cited by examiner

PRIORITIZING SEQUENTIAL APPLICATION TASKS

CROSS-REFERENCE TO RELATED APPLICATION

This application is a continuation of and claims priority to International Application No. PCT/CN2020/094065, titled "PRIORITIZING SEQUENTIAL APPLICATION TASKS," and filed on Jun. 3, 2020, the contents of all of which are hereby incorporated herein by reference in its entirety for all purposes.

FIELD OF THE DISCLOSURE

This application generally relates to prioritizing sequential tasks for an application. In particular, this technical solution can process data about a sequence of tasks and rank the tasks based on state information to prioritize the tasks.

BACKGROUND

Users of client devices can perform tasks using applications executed by the client devices. Users can provide information about the tasks performed using the applications to an administrator of an entity. The administrator of the entity can manage the users based on the information reported by the users.

SUMMARY

This Summary is provided to introduce a selection of concepts in a simplified form that are further described below in the Detailed Description. This Summary is not intended to identify key features or essential features, nor is it intended to limit the scope of the claims included herewith.

This technical solution generally relates to prioritizing sequential tasks for an application. The technical solution can process data about a sequence of tasks and rank the tasks based on state information to prioritize the tasks. For example, users can receive an electronic feed that indicates outstanding tasks to be performed by an application. A first user may perform a task before a second user such that the second user is dependent on the first user to perform the task. Due to the large number of outstanding tasks in a user's electronic feed, and the number of users that may be depending on the first user to complete the task, subsequent users may be idle awaiting the first user to perform the task, thereby delaying task completion and wasting computing resources. For example, if the task relates to configuring an application, server, computing device or other information technology asset, the delay can cause further downstream issues resulting from inoperative equipment or equipment that is operating in a suboptimal manner. Thus, systems and methods of this technical solution provide an efficient and accurate prioritization of sequential tasks for an application in order to reduce delay and facilitate completion of tasks.

At least one aspect of this technical solution is directed to a method. The method can be performed by one or more processors. The method can include the one or more processors receiving, from an application, data about a sequence of tasks to be performed by a plurality of users using a plurality of clients. The method can include the one or more processors identifying a first user from the plurality of users to perform a first task in the sequence of tasks. The method can include the one or more processors identifying a second user from the plurality of users to perform a second task in the sequence of tasks that is subsequent to the first task. The method can include the one or more processors determining a state of a first client associated with the first user and a state of a second client associated with the second user. The method can include the one or more processors establishing a rank for the first task for the first user based on the state of the first client and the state of the second client. The method can include the one or more processors providing, to the first client, data including the rank for the first task and information about the state of the second client to cause the first client to generate a graphical user interface that indicates the rank of the first task and an indication of the state of the second client.

In some implementations, the application is executed by a virtual machine executing on one or more servers. In some implementations, the method can include the one or more processors receiving an updated state for the second client. The one or more processors can establish a second rank for the first task for the first user based on the updated state for the second client. The one or more processors can provide, to the first client, an indication of the second rank for the first task to cause the first client to re-rank the first task in the graphical user interface based on the second rank.

In some implementations, the method can include the one or more processors identifying a third task in the sequence of tasks and a third user associated with a third client to perform the third task, wherein the third task is subsequent to the second task. The one or more processors can determine a state of the third client. The one or more processors can establish the rank for the first task for the first user based on both the state of the second client and the state of the third client.

The state of the second client can correspond to a ready state. The one or more processors can determine an amount of time the second client has been in the ready state. The one or more processors can establish the rank for the first task for the first user based on the state of the first client, the state of the second client, and the amount of time the second client has been in the ready state.

The state of the second client can correspond to a ready state. The one or more processors can determine an amount of time the second client has been in the ready state. The one or more processors can provide an instruction to the first client to update the graphical user interface to indicate the amount of time the second client has been in the ready state.

The one or more processors can determine an amount of time the second client has been in the state. The one or more processors can invoke a digital assistant to perform the first task on behalf of the first user responsive to the amount of time satisfying a threshold.

The one or more processors can receive an indication of completion of the first task by the first user. The one or more processors can receive an updated state of the first client that previously completed the first task. The one or more processors can provide, to the second client, information comprising the second task and the updated state of the first client to cause the second client to generate a graphical user interface displaying the second task and the updated state of the first client.

The one or more processors can provide, to the second client, responsive to completion of the first task by the first user, information comprising the second task and an updated state of the first client to cause the second client to generate a graphical user interface displaying the second task, the updated state of the first client, and a communication icon configured to establish a communication channel between the second client and the first client. The one or more processors can receive a request to establish the communication channel between the second client and the first client that previously performed the first task. The one or more processors can establish the communication channel responsive to the request.

The one or more processors can identify a third task of the sequence of tasks and a third user associated with a third client of the plurality of clients assigned to perform the third task. The third task can be subsequent to the second task. The one or more processors can retrieving, subsequent to completion of the second task, the state of the first client, the state of the second client, information associated with performance of the first task by the first user, and information associated with performance of the second task by the second user. The method can include the one or more processors providing, to the third client, a graphical user interface card configured to display the state of the first client, the state of the second client, the information associated with performance of the first task by the first user, the information associated with performance of the second task by the second user, and an icon configured to initiate a communication channel between the third client and at least one of the first client or the second client.

At least one aspect of this technical solution is directed to a system. The system can include one or more processors and memory. The one or more processors can receive, from an application, data about a sequence of tasks to be performed by a plurality of users using a plurality of clients. The one or more processors can identify a first user from the plurality of users to perform a first task in the sequence of tasks, and a second user from the plurality of users to perform a second task in the sequence of tasks that is subsequent to the first task. The one or more processors can determine a state of a first client associated with the first user and a state of a second client associated with the second user. The one or more processors can establish a rank for the first task for the first user based on the state of the first client and the state of the second client. The one or more processors can provide, to the first client, data comprising the rank for the first task and information about the state of the second client to cause the first client to generate a graphical user interface that indicates the rank of the first task and an indication of the state of the second client.

In some implementations, the application is executed by a virtual machine executing on one or more servers. In some implementations, the one or more processors can receive an updated state for the second client. The one or more processors can establish a second rank for the first task for the first user based on the updated state for the second client. The one or more processors can provide, to the first client, an indication of the second rank for the first task to cause the first client to re-rank the first task in the graphical user interface based on the second rank.

In some implementations, the one or more processors can identify a third task in the sequence of tasks and a third user associated with a third client to perform the third task, wherein the third task is subsequent to the second task. The one or more processors can determine a state of the third client. The one or more processors can establish the rank for the first task for the first user based on both the state of the second client and the state of the third client.

The state of the second client can correspond to a ready state. The one or more processors can determine an amount of time the second client has been in the ready state. The one or more processors can establish the rank for the first task for the first user based on the state of the first client, the state of the second client, and the amount of time the second client has been in the ready state.

The state of the second client can correspond to a ready state. The one or more processors can determine an amount of time the second client has been in the ready state. The one or more processors can provide an instruction to the first client to update the graphical user interface to indicate the amount of time the second client has been in the ready state.

The one or more processors can determine an amount of time the second client has been in the state. The one or more processors can invoke a digital assistant to perform the first task on behalf of the first user responsive to the amount of time satisfying a threshold.

The one or more processors can receive an indication of completion of the first task by the first user. The one or more processors can receive an updated state of the first client that previously completed the first task. The one or more processors can provide, to the second client, information comprising the second task and the updated state of the first client to cause the second client to generate a graphical user interface displaying the second task and the updated state of the first client.

The one or more processors can provide, to the second client, responsive to completion of the first task by the first user, information comprising the second task and an updated state of the first client to cause the second client to generate a graphical user interface displaying the second task, the updated state of the first client, and a communication icon configured to establish a communication channel between the second client and the first client. The one or more processors can receive a request to establish the communication channel between the second client and the first client that previously performed the first task. The one or more processors can establish the communication channel responsive to the request.

The one or more processors can identify a third task of the sequence of tasks and a third user associated with a third client of the plurality of clients assigned to perform the third task. The third task can be subsequent to the second task. The one or more processors can retrieving, subsequent to completion of the second task, the state of the first client, the state of the second client, information associated with performance of the first task by the first user, and information associated with performance of the second task by the second user. The one or more processors can provide, to the third client, a graphical user interface card configured to display the state of the first client, the state of the second client, the information associated with performance of the first task by the first user, the information associated with performance of the second task by the second user, and an icon configured to initiate a communication channel between the third client and at least one of the first client or the second client.

At least one aspect of this technical solution is directed to a non-transitory computer readable medium storing web browser executable instructions that, when executed by the web browser, cause one or more servers to provide a digital service to perform tasks. The instructions can include instructions to provide, to one or more processors, an indication of a state of a first client associated with a first user. The one or more processors can be configured to receive, from an application, data about a sequence of tasks to be performed by a plurality of users using a plurality of clients. The one or more processors can identify the first user from the plurality of users to perform a first task in the sequence of tasks, and a second user from the plurality of users to perform a second task in the sequence of tasks that is subsequent to the first task. The one or more processors can determine the state of the first client associated with the first user and a state of a second client associated with the second user. The one or more processors can establish a rank for the first task for the first user based on the state of the first client and the state of the second client. The one or more processors can provide, to the first client, data comprising the rank for the first task and information about the state of the second client. The one or more processors can generate a graphical user interface that indicates the rank of the first task and an indication of the state of the second client.

BRIEF DESCRIPTION OF THE DRAWINGS

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIGS. 3A-3J depict example graphical user interfaces for providing a prioritization of sequential application tasks, in accordance with implementations.

DETAILED DESCRIPTION

Figure 1A:
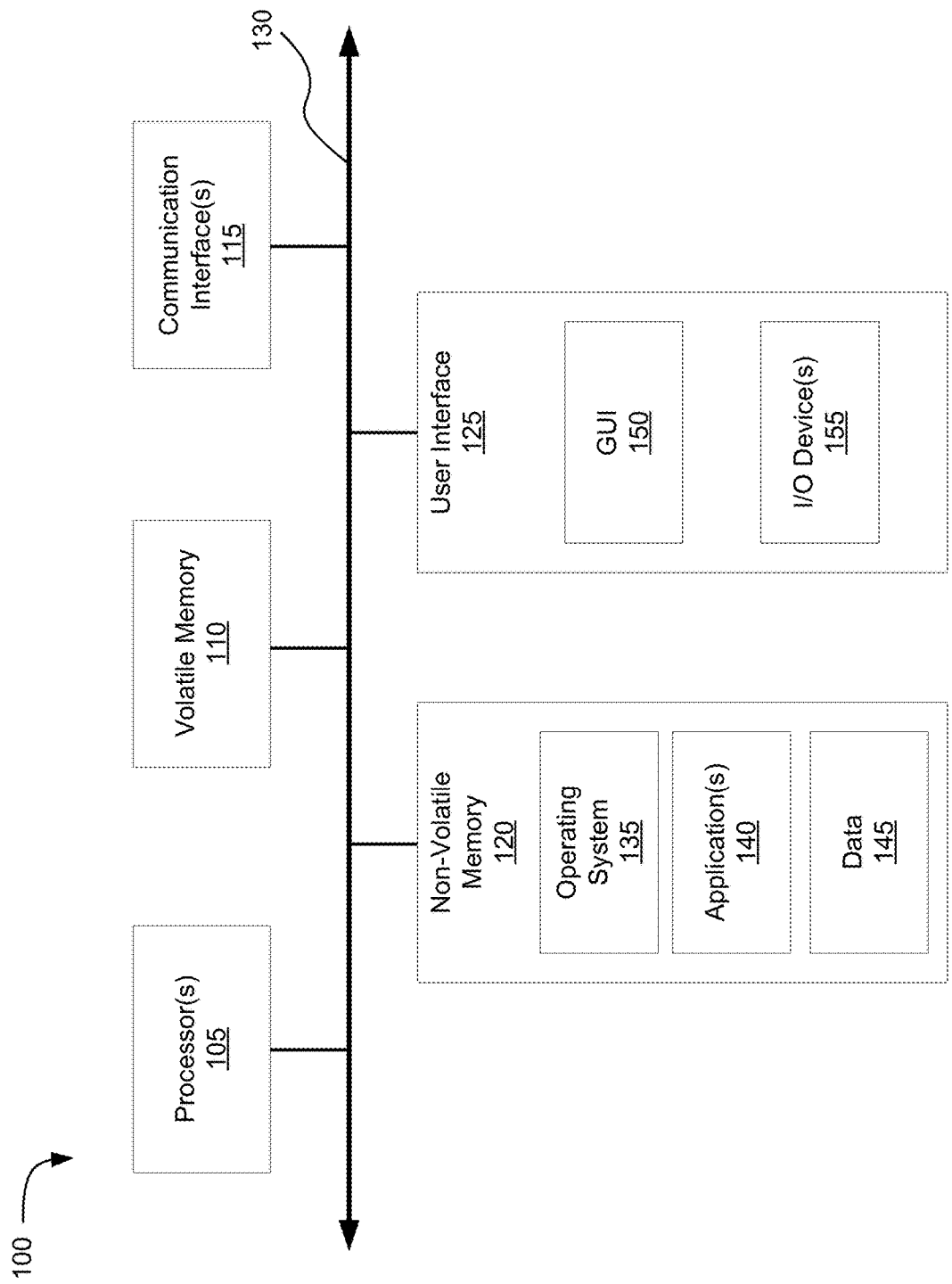
FIG. 1A is a block diagram of embodiments of a computing device.

Following below are more detailed descriptions of various concepts related to, and implementations of, methods and systems for prioritizing sequential application tasks. The various concepts introduced above and discussed in greater detail below may be implemented in any of numerous ways.

Digital, cloud-based workspace computing environments can provide increased efficiency for end users and client devices by adding new features such as a virtual assistant or an intelligent activity feed. These features can provide the user with a unified experience, which can reduce rendering or processing on the client devices, while help guide and focus work for the user. However, in such a digital, cloud-based workspace computing environment, it can be challenging to notify the user of higher priority actions or which action, when delayed, can introduce a significant bottleneck or delay in downstream tasks. While actions can be sorted based on due date, relevance, or order by date, it can be challenging to determine a priority of an action based on how performance of the action impacts the remainder of the team with which the user is collaborating. For example, a workflow can include multiple steps and the user may only be involved in a first step, while other users may be responsible for subsequent steps. Subsequent users may rely on the first user to perform their action before the subsequent users can perform their task. Since users collaborate among those steps, one user's output is other's input or one's approval helps to kick off other's tasks.

Further, it may be challenging for a successor user to determine from where the workflow originated, information about which users have contributed to the workflow, contact the predecessor users, what happened in the workflow prior to the workflow reaching the current user, or how much time has been spent on the workflow. For example, users may have to launch multiple applications to determine information about the workflow or contact other users associated with the workflow, which can result in increased computer resource utilization, obfuscated graphical user interfaces, and introduce further delays in completion of the workflow.

Thus, systems and methods of this technical solution can improve productivity for a user by feeds in terms of micro-app or actional activity. The technical solution can improve informational content and guidance by prompting the user as to which action to perform first in order to improve task performance and productivity of all users collaborating in a digital workflow. The technical solution can prioritize notifications for actions as well as indicate, via a graphical user interface, the number of subsequent users and state information associated with the subsequent users in the workflow such as a wait time of the subsequent users. By prioritizing notifications for actions and providing additional state information, this technical solution can reduce the amount of time taken to complete a digital workflow.

To do so, this technical solution can retrieve additional information from a workflow such as such as relations, dependencies, predecessor and successors within each application in a digital workspace. The technical solution can determine state information for each of the related users and aggregate how long successors are waiting for each action to be performed by the current user. The technical solution can further determine if successor users are online in order to determine which actions to initiate based on whether the successor user is online and in the ready state. Upon determine which actions to initiate, the technical solution can generate a notification to provide to the current user to initiate the action. The notification can include information about the action, an indication of the one or more successor users, and information about how long the one or more successors have been waiting for the current user. Thus, this technical solution can provide a graphical user interface conveying the informative urgency to the current user and then facilitate performance of tasks in the workflow by the current user and successor users.

The technical solution can provide a notification with all details of previous stages of the workflow, while simultaneously displaying all predecessors in the workflow and providing a mechanism to communicate with the predecessor via the notification. This can save computing resource utilization and time by avoiding the need to launch a different application (e.g., an electronic mail application) in order to communicate with a predecessor, and by consolidating the communications within the notification feed. In addition, this technical solution can transfer assigned task into a micro-workflow view by providing additional context.

Prior to discussing the specifics of embodiments of the systems and methods of an appliance and/or client, it may be helpful to discuss the computing environments in which such embodiments may be deployed. As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
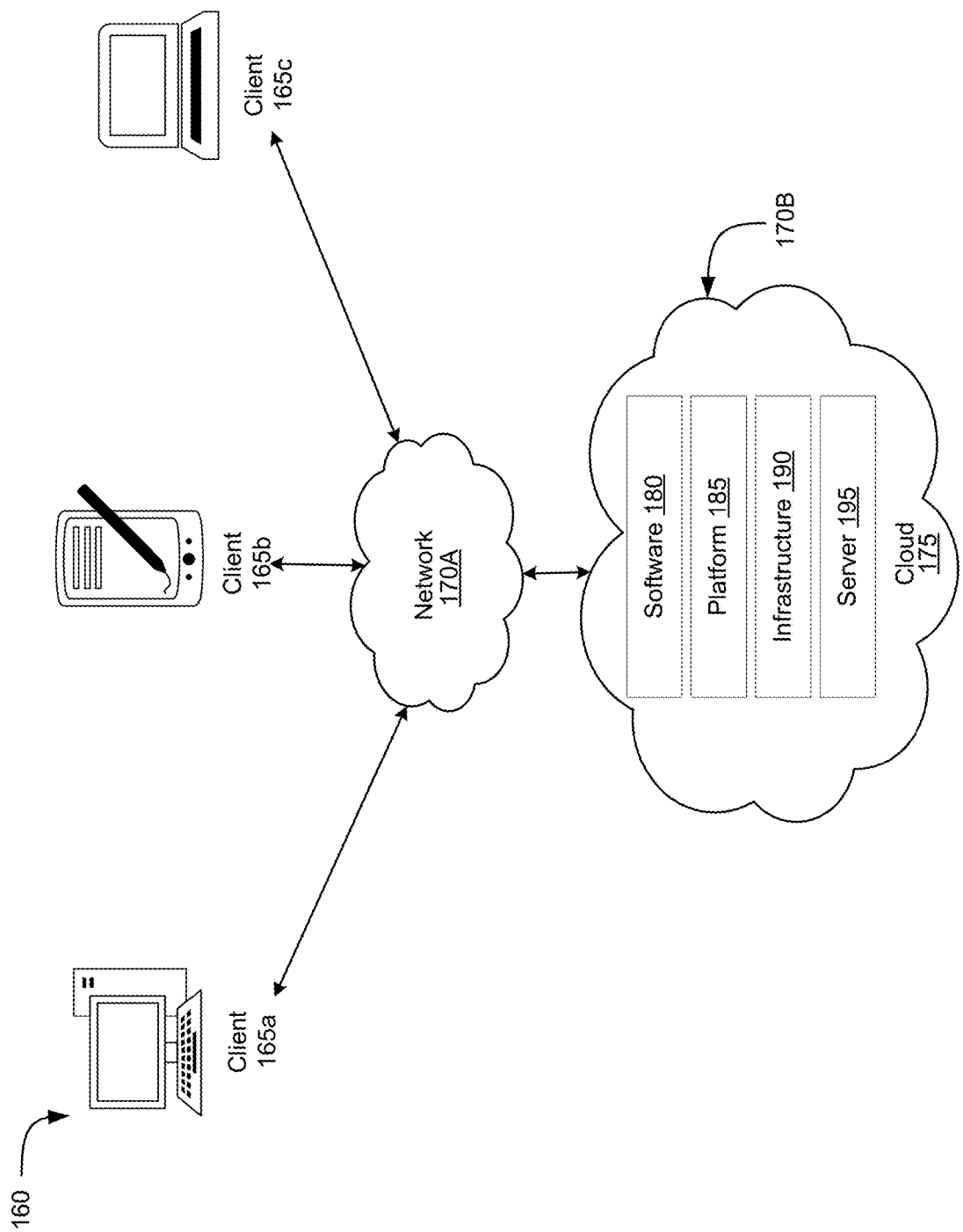
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170A. Private clouds 175 may include private servers 195 that are physically maintained by clients 165 or owners of clients 165. Private clouds 175 may be connected to the servers 195 over a private network 170B. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 2A:
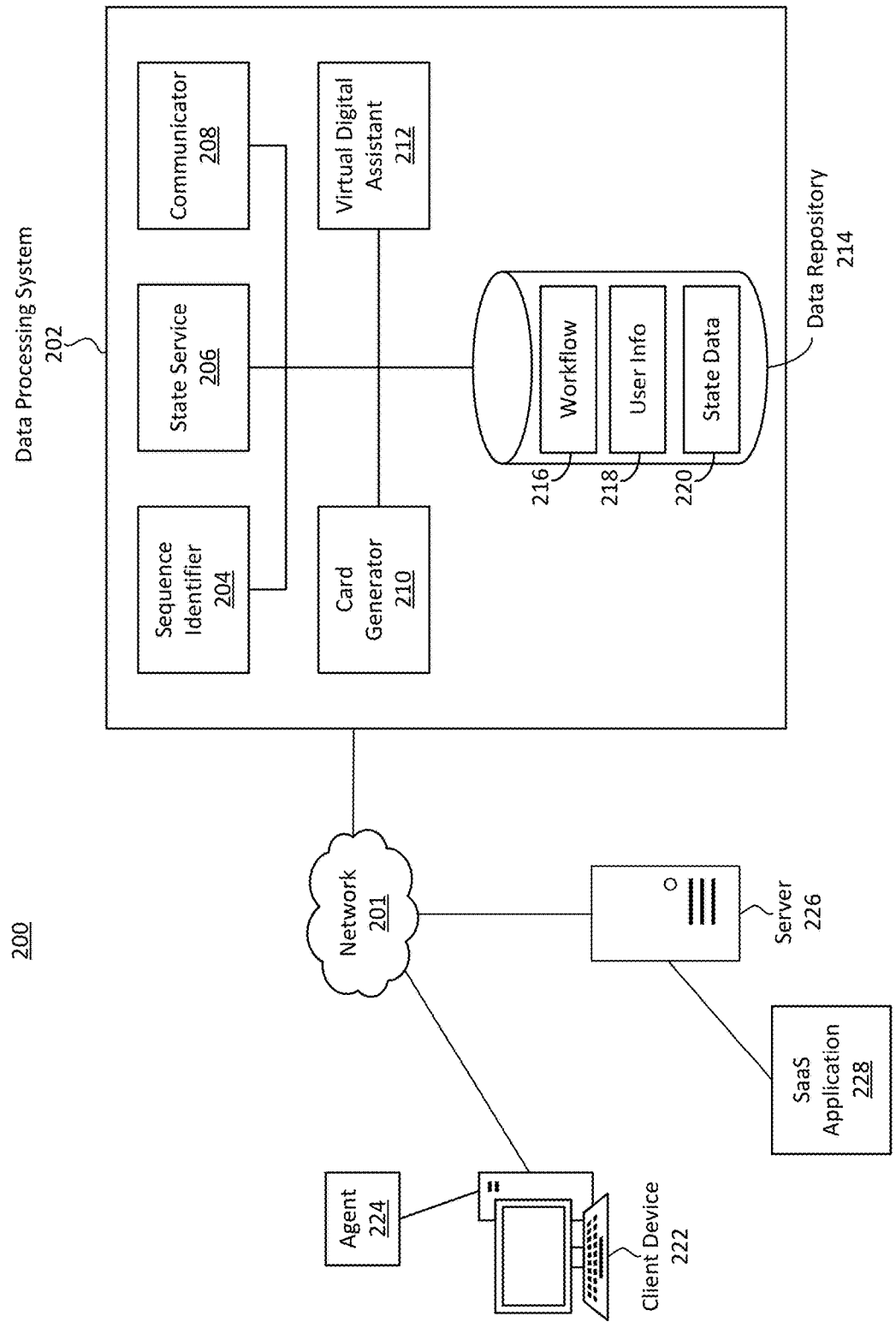
FIG. 2A depicts an example block diagram of a system to prioritize sequential application tasks, in accordance with an implementation.

FIG. 2A depicts an example block diagram of a system to prioritize sequential application tasks, in accordance with an implementation. In brief overview, the system 200 can include a data processing system 202. The data processing system 202 can include at least one sequence identifier 204. The data processing system 202 can include at least one state service 206. The data processing system 202 can include at least one communicator 208. The data processing system 202 can include at least card generator 210. The data processing system 202 can include at least one virtual digital assistant 212. The data processing system 202 can include at least one data repository 214. The data repository 214 can include or store one or more of a workflow 216, user information 218, or state data 220. Each of the sequence identifier 204, state service 206, communicator 208, card generator 210, or virtual assistant can include one or more of a processing circuit, module, component, digital logic, scripts, rules, programs or components or functionality depicted in FIG. 1A and FIG. 1B.

The data processing system 202 can interface with a client device 222 via network 201. The client device 222 can provide a native (e.g., access to local applications) or virtual computing environments (e.g., access to a virtual desktop hosted by a server in a cloud 175). The client device 222 can execute one or more programs or applications (e.g., applications or tools such as an electronic mail ("e-mail") program (e.g., Outlook), a word processing program, a software version control program, presentation program, spreadsheet program, calendar program, video conference program, asynchronous communication program, etc.). The client device 222 can execute one or more agents 224 that can obtain data about a state of the client device 222.

The network 201 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wire line network. The network 201 can include one or more of network 170A or network 170B depicted in FIG. 1B.

The data processing system 202 can be at least one logic device such as a computing device having a processor to communicate via the network 201, for example, with the client device 222. The data processing system 202 can include at least one computation resource, server, processor or memory. For example, the data processing system 202 can include multiple computation resources or servers located in at least one data center. The data processing system 202 can include multiple, logically-grouped servers and facilitate distributed computing techniques. The data processing system 202 can include or execute in a cloud 175. The data processing system 202 can include one or more servers 195. The data processing system 202 can communicate via network 201 with client device 222 or server 226. The client device 222 can include one or more of component or functionality of client 165*a-c*. The client device 222 can include a client 165*a*, 165*b*, or 165*c*. The server 226 can include one or component or functionality of server 195. The server 226 can be a part of cloud 175, or remote from cloud 175. For example, the server 226 can be maintained or associated with a third-party entity separate from the data processing system 202.

The server 226 can host, run, execute, deliver, or otherwise provide a SaaS application 228 (e.g., a software-as-a-service application). The SaaS application 228 can be any type or form of application. The client device 222 can use, access, interface with, or otherwise communicate with SaaS application 228 via network 201. The SaaS application 228 can include, for example, an information technology ("IT") issue tracking application, bug tracking application, an agile project management application, a resource allocation or assignment application, a ticket management system, an electronic service board application, or an IT incident management application. The SaaS application 228 can be executed by one or more virtual machines executing on one or more servers 226. The one or more servers 226 can execute one or more instances of the SaaS application 228 via one or more virtual machines. A virtual machine can refer to an emulation of a computing system, such as a software program or operating system that exhibits the behavior of a separate computer and is capable of performing tasks such as running applications and programs in a manner similar to which a separate computer can run applications and programs.

The SaaS application 228 can include digital workflows (or electronic workflows). A digital workflow can refer to or include multiple tasks to be performed by one or more users of the SaaS application 228. The digital workflow can indicate various information about the tasks including, for example, an order in which the tasks are to be performed, identifiers of users that are to perform each of the tasks, a deadline or time limit for completion of an individual task in the workflow or all tasks in the workflow, the type of task, or other information that facilitates performance and completion of the task. The digital workflow can include a data structure, data file, table, or other type of data storage capable of storing information about a sequence of tasks to be performed by users.

Still referring to FIG. 2A, and in further detail, the data processing system 202 can include a sequence identifier 204 designed, configured and operational to receive data about a sequence of tasks to be performed by a group of users using clients (e.g., client devices 222). The sequence of tasks can correspond to a digital workflow in which a first user performs a first task using a first client and a second user subsequently performs a second task using a second client device. The second user can perform the second task subsequent (or after) the first user performs the first task. The second user can perform the second task after the first user has completed performing the first task. The second user performs the second task upon completion of the first task by the first user.

The digital workflow or sequence of tasks can include two or more tasks (e.g., three tasks, four tasks, five tasks, six tasks, seven tasks or more). Each of the tasks in the sequence of tasks can be performed by a different user via a different client device. In some cases, the same user can perform two or more tasks in the sequence of tasks using the same client device 222. For example, a first user can perform a first task, a second user can perform a second task after the first task is completed, and the first user can also perform a third task after the second task has been completed.

The data about the sequence of tasks can include various information used by the data processing system 202 to prioritize or rank the tasks and generate notifications about the tasks. For example, the data about the sequence of tasks can include a type of task, an identifier for a task, an indication of the user that is to perform the task, relationship or dependency information between tasks, or a deadline or time limits for a particular task or for the entire workflow. The group of users can correspond to users that are associated with a same entity or organization, such as a company. The group of users can correspond to a team users within a company. The data about the sequence of tasks can include an identifier for the group of users that perform the tasks.

The sequence identifier 204 can store the data about the sequence of tasks in a digital workflow 216 data structure or database in data repository 214. To obtain the digital workflow, the sequence identifier 204 can include an interface or application programming interface ("API") configured to communicate or interface with the SaaS application 228 executing on a server 226. The sequence identifier 204 can transmit a request for data about a digital workflow to the SaaS application 228 via network 201. The sequence identifier 204 can request data from the SaaS application 228 based on a time interval, periodically, or responsive to a condition or trigger event. For example, the sequence identifier 204 can request data from the SaaS application 228 periodically such as every 1 minute, 5 minutes, 10 minutes, 20 minutes, hourly, every 6 hours, every 12 hours, every 24 hours, or based on some other interval. The sequence identifier 204 can request data from the SaaS application 228 responsive to a request from a client device 222 or administrator of the data processing system 202. The sequence identifier 204 can request data from the SaaS application 228 responsive to a condition such as receiving an indication that the digital workflow data structure 216 is out of synchronization with digital workflows maintained by the SaaS application 228.

In some cases, the SaaS application 228 can push or automatically provide the data about the digital workflow (e.g., sequence of tasks) to the data processing system 202. The SaaS application 228 can determine to transmit data about digital workflows to the data processing system 202 responsive to a change to a digital workflow maintained by the SaaS application 228. For example, a client device 222 can add, remove, change, or otherwise modify a digital workflow using the SaaS application 228. The SaaS application 228 can transmit the new or updated digital workflow to the data processing system 202 responsive to the digital workflow being added or modified. Thus, the data processing system 202 can synchronize digital workflow data structure 216 with the digital workflow maintained by the SaaS application 228.

The digital workflow can be in any format that facilitates providing information regarding the number of tasks, sequence of tasks, users assigned to perform the tasks, and a description of the task. The digital workflow can be stored in a table, text file, data structure, document, spreadsheet, an extensible markup language, or in any other format. The sequence identifier 204 can be configured to parse or process the digital workflow in order to identify attributes of the digital workflow, such as task numbers, users, dependencies, and task description.

The sequence identifier 204 can process the digital workflow to identify one or more users that are to perform one or more tasks. The sequence identifier 204 can identify a sequence of tasks and a first user of a group of users to perform a first task in the sequence of tasks. The sequence identifier 204 can identify a second user from the group of users to perform a second task in the sequence of tasks that is subsequent to the first task. The digital workflow can include an indication of a relation between the tasks. For example, the digital workflow can indicate that the second task is dependent upon completion of the first task. The digital workflow can indicate that the second task is subsequent to the first task. Similarly, the digital workflow can indicate that a third task is dependent upon completion of the second task and the first task. The digital workflow can indicate when a user can being performing a task, such as by indicating that the user can begin performing a second task after the first task has been completed.

The following table illustrates and exemplary digital workflow for a sequence of tasks to provide a new desktop computer to replace a customer's old desktop computer:

TABLE 1

Illustrative Example Digital Workflow

| Task # | User Identifier | Dependency | Task Description |
|---|---|---|---|
| 1 | User_A | N/A | Review/Approve Request for New Desktop Computer |
| 2 | User_B | Depends on Approval in Task 1 | Asset Administrator to select and provide new hardware |
| 3 | User_C | Depends on hardware assets being provided in Task 2 | Configure hardware and software for new desktop and provide to customer |
| 4 | User_D | Depends on new hardware and software being configured in Task 3 | Train customer on how to use new desktop |

Table 1 illustrates and example digital workflow with a sequence of tasks and dependencies between each of the tasks. The digital workflow identifier a user to perform each of the tasks, the dependencies between each of the tasks, and a description of the task. In this example, the first user, or User_A, receives a request for a new desktop to replace a new desktop of a customer. Before the second user, or User_B, can perform their task of selecting and providing the hardware, it is necessary for User_A to approve the request for the new desktop computer, as illustrated in the Dependency column in the digital workflow. Accordingly, User_B can begin their task after User_A approves the request and completes the first task. Similarly, the digital workflow indicates that the third task to configure the hardware and software for the new desktop cannot begin until User_B has completed the second task of selecting and providing the hardware for the new desktop computer. After the second task has been completed, User_C can begin performance of the third task. Similarly, the fourth task of training the customer on how to use the new desktop computer cannot begin until User_C has completed configuration of the hardware and software and delivered the new desktop to the customer and setup the new desktop computer. Thus, this digital workflow indicates a sequence of tasks (e.g., tasks 1 through 4) to be performed by a group of users (e.g., User_A, User_B, User_C, and User_D), where subsequent tasks (e.g., tasks 2 through 4) depend upon completion of a prior task (e.g., at least Task 1) or cannot be performed until a prior task has been completed.

The data processing system 202 can include a state service 206 designed, constructed and operational to determine state information for client devices 222 used by users assigned to perform tasks in the digital workflow. For example, the state service 206 can determine a state of a first client device 222 of a first user (e.g., User_A in the example digital workflow depicted in Table 1) and determine a state of a second client device 222 of a second user (e.g., User_B in the example digital workflow depicted in Table 1). In some cases, the state service 206 may determine the states of one or more subsequent users and skip determining the state of the first user or initial user. In some cases, the state service 206 can skip determining the state of the current user, which can refer to the user that is currently performing the task, or currently able to perform the task based on prior tasks being completed.

The state of a client device 222 can indicate whether the user of the client device 222 is ready or available to begin performing a task. The state of the client device 222 can further indicate a duration of the state, such as an amount of time the user of the client device 222 has been ready or available to begin performing the task. The state can refer to or include whether the client device 222 is online or offline, a ready state, an idle state, or a busy state.

A client device 222 can be associated with a user if the user is logged into the client device 222 using authentication credentials corresponding to the user. For example, the client device 222 can be associated with User_A if the username or account information used to log into the client device 222 correspond to User_A's username or account information. The user can log into the client device 222 or a SaaS application being provided via the client device 222.

To determine whether a user is ready or available to perform a task, the state service 206 can identify the client device 222 associated with the user, and then obtain state information from the client device 222, such as via an agent 224 executing on the client device 222. In some cases, the state service 206 can receive state information about the user from the client device 222 or agent 224 thereof. For example, the state service 206 can receive state information from the client device 222 based on a time interval, periodically, responsive to a change in the state or update to the state of the client device 222, or user thereof. The state service 206 can receive the state information along with a user identifier or an identifier of the client device 222 and a timestamp or duration of the state. The state service 206 can store the state information in a state data structure 220 in data repository 214. The state service 206 can store historical state information along with date and time stamps and duration for the state for each user identifier.

The client device 222 can include an agent 224 designed, constructed and operational to monitor activity on the client device 222. The activity can include input/output activity, such as keyboard or mouse input, or voice input. The agent 224 can monitor one or more applications executed by or via the client device 222 to determine the state information. An application executing on the client device 222 can indicate an available state, away state, or busy state. The application can be, for example, a chat application, e-mail application, or calendar application. The agent 224 can determine, based on the state indicated via the application or input/output of the client device 222 whether the user of the client device 222 is online and available. The agent 224 can transmit the state information to the data processing system 202 via network 201. The agent 224 can automatically push the state information to the data processing system 202 based on a time interval or responsive to a change in the state, or the agent 224 can transmit the state information responsive to a request from the data processing system 202 for state information.

The state service 206 can receive data from the client device 222 (e.g., via agent 224) about processes or applications executed in a native or virtual computing environment by the client device 222. The client device 222 can provide a virtual computing environment hosted by a cloud 175. The applications can include one or more SaaS or other web applications 510 or resource feeds 506 provided via a cloud computing environment 514 depicted in FIG. 5A, 5B, or 5C. The data can be received based on an event, time interval, periodically, responsive to a request for data, based on a state of the client device 222, responsive to user login, or based on some other condition or trigger.

The state service 206 can receive data from the agent 224 executing on the client device 222. The agent 224 can be a software program executable on a client device 222 that receives input or instructions from the data processing system 202, and provides output to the data processing system 202. The agent 224 can include a script, daemon, monitor, or other program that can capture data of applications executable on or via the client device 222. The agent 224 can include one or more component or functionality of a task manager program of an operating system for the client device 222. The agent 224 can perform a screen capture, or otherwise capture information of processes that are executing in the client device 222. For example, the agent 224 can leverage a task manager program of the client device 222 to identify processes that are executing on the client device 222. The agent 224 can communicate with an individual SaaS application, such as a SaaS application 228 or a SaaS application 510 depicted in FIGS. 5A and 5B. The agent 224 can be a plug-in to a client device 222. The agent 224 can be a daemon running in the backend in the client device 222.

In some cases, the state service 206 can poll specific client devices 222 associated with user identifiers assigned to perform tasks. The state service 206 can parse the digital workflow to identify the users that are subsequent to the current user. The state service 206 can perform a lookup in a user info data structure 218 stored in the data repository 214 to determine an identifier of a client device 222 or agent 224 associated with the user identifier. The state service 206 can transmit a request to the corresponding client device 222 or agent 224 for the state information. The state service 206 can poll or query the agent 224 or client device 222 for state information. The state service 206 can poll or query the agent 224 or client device 222 for state information responsive to determining the user is dependent on the current user in order to perform a subsequent task. Thus, and in some cases, the state service 206 can poll or query only those client devices 222 that are subsequent to the current user in order to reduce computing resource utilization, network bandwidth transmissions, or remote procedure calls relative to polling a group of client devices 222 that are not associated with users that are to perform a subsequent task, or relative to the group of client devices 222 periodically transmitting state information to the data processing system 202 regardless of whether the client device 222 is dependent on the current user to perform a task.

The state service 206 can determine a state of the user or client device 222 based on the state information. The state service 206 can use a mapping, policy, or machine learning model or function to determine the state of the client device. Using a mapping, the state service 206 can determine the state of the user based on the received state information as follows: if received state information indicates the user is online and available, then the user in a ready state; if the received state information indicates that the user is busy, in a meeting, or on a call, then the user is not in a ready state (or in an unavailable state); if the received state information indicates the client device is idle or inactive, then the user is not in a ready state.

The state service 206 can use a policy in order to take additional factors into account when determining the state of the user. The policy can take into account whether the user has other uncompleted tasks that take priority over the current task, geographic location of the user, time of day, type of client device 222, or type of task. For example, if the user has other tasks in their queue that take priority over the new task, then the state service 206 can determine that the state of the user is unavailable even though the agent 224 may indicate that the user is online and not busy due to being in a meeting or on a call. To determine whether the user has other tasks in their queue, the state service 206 can query the SaaS application 228, or multiple SaaS applications 228 for which the user performs tasks.

The state service 206 can use a policy that takes into account a time of day to determine the state of the user. The policy can indicate the working hours of the user, such as 9 AM to 5 PM. If the current time in the geographic location of the user is 5:05 PM, then the state service 206 can determine that the user is not in a ready state even if the agent 224 indicates that the client device 222 is online and available. For example, the current time for the current user may be 4:05 PM, but the current time for the successor user may be 5:05 PM due to the different time zone of the successor user. Thus, the state service 206 can determine that the state of the successor user is unavailable, and use this state information of the successor user to rank tasks for the current user.

The state service 206 can use a machine learning model trained using historical data to determine the state of the user. The historical data can include historical state information, types of tasks, task performance information, client device information, or other information. The output of the machine learning model can indicate how soon after receiving a task a user initiated performance of the task under various conditions. For example, the user may have one task from a previously established workflow with higher priority than the task in the current workflow. The state service 206 can determine the type of task and estimate, based on the historical task performance information, the amount of time it will take the user to perform the task. The state service 206 can determine that if the amount of time to perform the task is 2 minutes (e.g., a task to reset a user's password for a SaaS application), then the state service 206 can determine that the user is in a ready state even though the user may have this outstanding task. The machine learning model can be trained to indicate the user's working hours based on historical task performance information indicating the times during a particular day when a user performs tasks. The machine learning model can be trained to indicate whether the user is in a ready state based on the type of client device 222 the user is logged into and the type of task. For example, the user may be able to perform certain types of tasks on a mobile phone, whereas the user may only be able to perform other types of tasks on a laptop computer or desktop computer. Thus, the state service 206 can determine a task-specific state of the user based on the type of client device 222 being used by the user and using a model that has been trained using historical task performance information and the types of client devices used by the user historically to perform those tasks.

The state service 206 can rank tasks for the current user based on the states of subsequent users in the digital workflow. The state service 206 can assign a score or rank to a task for the current user based on whether the successor users are in a ready state and based on how long the successor users have been in a ready state. The state service 206 can determine the score or rank for the task for the current user based on the state of the current user and the states of one or more successor users.

The state service 206 can use one or techniques, functions, or policies to rank or score the task for the current user. For example, the current user can be assigned four tasks corresponding to four different digital workflows. The state service 206 can determine the states of successor users assigned to subsequent tasks in each of the four workflows. The state service 206 can determine the duration of time that subsequent users of each of the workflows have been in a ready state. The state service 206 can aggregate the duration of time to determine the total amount of time that successor users in each workflow have been in a ready state. The state service 206 can then rank the tasks based on the amount of time successor users have been in a ready state, with the highest amount of time corresponding to the highest rank or highest priority digital workflow. The state service 206 can then rank the task assigned to the current workflow from the highest ranked digital workflow as the highest ranked task for the current user to perform.

TABLE 2

Illustrative Example Depicting Ranking of Tasks for a Current User

| | Digital workflow ID | Task 1 | Task 2 | Task 3 | Task 4 | Aggregated Successor Wait time for a Current User | Rank for a current user relative to other tasks |
|---|---|---|---|---|---|---|---|
| User Assignment/Ready Duration | 1 | User_A/ 0 min | User_B/ 1 min | User_C/ 2 min | User_D/ 3 min | User_A (6 min) User_B (5 min) User_C (3 min) User_D (0 min) | User_A: First priority User_B: tied for first priority User_C: second priority User_D: fourth priority |
| User Assignment/Ready Duration | 2 | User_B/ 1 min | User_C/ 2 min | User_D/ 3 min | User_A/ 0 min | User_B (5 min) User_C (3 min) User_D (0 min) User_A (0 min) | User_A: fourth priority User_B: tied for first priority User C: tied for second priority User_D: fourth priority |
| User Assignment/Ready Duration | 3 | User_C/ 2 min | User_D/ 3 min | User_A/ 0 min | User_B/ 1 min | User_C (4 min) User_D (1 min) User_A (1 min) User_B (0 min) | User_A: third priority User B: fourth priority User C: first priority User_D: second priority |

TABLE 2-continued

Illustrative Example Depicting Ranking of Tasks for a Current User

|  | Digital workflow ID | Task 1 | Task 2 | Task 3 | Task 4 | Aggregated Successor Wait time for a Current User | Rank for a current user relative to other tasks |
|---|---|---|---|---|---|---|---|
| User Assignment/Ready Duration | 4 | User_D/ 3 min | User_A/ 0 min | User_B/ 1 min | User_C/ 2 min | User_D (3 min) User_A (3 min) User_B (2 min) User_C (0 min) | User_A: second priority User B: third priority User_C: fourth priority User_D: first priority |

Table 2 depicts an illustrative example of ranking tasks for users based on the amount of time a successor user has been in a ready state. As illustrated in Table 2, the rank is specific to each user based on the amount of time successor users are waiting. The current user refers to the user that is currently supposed to perform a task; for example, the current user is the user that is assigned to perform the next task in the sequence of tasks of the digital workflow that has not yet been completed. The current user ceases to become the current user when the user has completed performance of the task, and the user assigned to perform the subsequent task in the sequence of tasks becomes the new current user. Thus, the current user is determined based on which tasks in the digital workflow have been completed.

In the example illustrated in Table 2, there are four digital workflows with tasks. In each of the four digital workflows, task 1 can be an initial task and therefore not dependent on or subsequent to any other task; task 2 can be subsequent to and dependent on task 1; task 3 can be subsequent to and dependent on task 2; and task 4 can be subsequent to and dependent on task 3. The digital workflows can be in different states of completion (e.g., 0, 1, 2, 3 or 4 tasks in the digital workflow may be complete).

The state service 206 can determine the rank of the task for the current user based on the amount of time successor have been in a ready state (e.g., the amount of time successor users have been waiting for the current user to perform the task on which the successor user is depending). For example, the current user can be User_A. User_A can be currently assigned 4 tasks as follows: Workflow(1).Task_1; Workflow(2).Task_4; Workflow(3).Task_3; and Workflow (4).Task_2. User_A can be assigned these four tasks in these four digital workflows upon completion of any predecessor tasks in each of these workflows. The state service 206 can determine a rank for each of these four tasks for User_A. The state service 206 can rank the four tasks assigned to User_A based on an aggregated amount of time any successor users have been waiting on User_A to complete User_A's current task. In workflow(1), successor users have been waiting on User_A for a total of 6 minutes; in workflow (2), User_A is assigned the final task in the sequence of tasks so there are no successor users to User_A; in workflow(3), successor users have been waiting on User_A for a total of 1 minute; in workflow(4), successor users have been waiting on User_A for a total of 3 minutes. The state service 206 can rank the four tasks based on the total amount of time successors have been waiting in each workflow such that the longest wait time corresponds to the highest ranked task. In this example, the rank would be as follows: Workflow(1)_Task_1 is the highest ranked task with a 6 minute successor wait time; Workflow(4)_Task_2 is the second highest ranked task with a 3 minute successor wait time; Workflow(3)_Task_3 is the third highest ranked task with a 1 minute successor wait time; and Workflow(4)_Task_4 is the lowest ranked task with a 0 minute successor wait time as there are no successors.

The state service 206 can take additional or different factors into consideration when ranking tasks for a current user. The factors can include, for example, deadline for completion of the digital workflow, importance of the task (high, medium or low priority level assigned by an administrator), instructions to perform the task out-of-turn, or feedback from customer.

The state service 206 can determine the rank of the task based on the state of the current user and the state of the successor users. For example, the state of the successor user (e.g., second client device 222) can correspond to a ready state, and the state service 206 can determine an amount of time the second client device 222 has been in the ready state. The state service 206 can establish the rank for the first task for the first user based on the state of the first client device 222, the state of the second client device 222, and the amount of time the second client device 222 has been in the ready state.

The state of the current user can indicate what types of tasks the current user is capable of performing at a current time. The state of the user can refer to the type of client device 222 being used by the current user, geographic location of the client device 222 of the current user, time of day relative to working hours of the current user. For example, the type of task may require the use of an application that is installed on the user's laptop computer but not the user's tablet computer. The current user may be logged in via a client device 222 that is a tablet computer. Accordingly, the state service 206 can determine that it may not be possible for the user to perform the current task based on the type of the client device 222, and therefore rank this task lower if there are other tasks in the user's task queue that can be performed by the user via the tablet computer. In another example, the state service 206 can rank the task based on the estimated amount of time to complete the task and the amount of time remaining in the current user's workday. For example, the current user can have three tasks that are ready for the current user to perform and there may be 10 minutes left in the current user's workday. The first task may take 90 minutes to complete, whereas each of the other two tasks may only take 5 minutes to complete. While the first task may have successors that have been waiting longer than successors in the remaining two tasks, the state service 206 can determine that even if the first task was ranked highest and provided to the current user, it would not be completed today, and the remaining two tasks would accrue longer successor wait times by another day. In this situation, the state service 206 can determine to rank the two tasks that can be completed within the current user's current work day, and rank the first task as the highest ranked task for the next workday, thereby minimizing the overall successors wait times across the three tasks. Thus, the state service 206 can take into account the state of the current user (e.g., type of client device and work day) as well as the state information of one or more successor users in order to establish a rank for tasks for the current user. For example, the state service 206 can identify a third task in the sequence of tasks and a third user associated with a third client device 222 to perform the third task, where the third task is subsequent to the second task. The state service 206 can determine a state of the third client device 222 and establish the rank for the first task for the first user based on both the state of the second client device 222 and the state of the third client device 222.

The state service 206 can re-rank tasks based on updated state information. The state service 206 can update the priority or rank of a task responsive to receiving updated state information about the current user or successor users. The state service 206 can re-rank tasks based on a time interval or periodically (e.g., every 5 minutes, 10 minutes, 20 minutes, 30 minutes, 1 hour, 6 hours, 12 hours), or responsive to detecting a change in a state of the current user or successor user. The state service 206 can re-rank all tasks from all digital workflows assigned to a current user based on a change in a state to any successor user in any of the digital workflows. For example, the state service 206 can re-rank the following tasks for User_A: Workflow(1)_Task_1, Workflow(4)_Task_2, Workflow(3)_Task_3, and Workflow(4)_Task_4. The state service 206 can re-rank these tasks based on a change of state to a successor user in Workflow(1). The change of state can reflect that a successor user may no longer be available or no longer be in a ready state, which may lower the rank or priority of User_A's task in Workflow(1) because the aggregated wait time may be reduced. This may result in Workflow(4)_Task_2 replacing Workflow(1)_Task_1 as the highest ranked task for User_A. Thus, the state service 206 can receive an updated state for the second client and then establish a new rank (or second rank) for the first task for the first user based on the updated state for the second client. The data processing system 202 can then provide, to the first client, an indication of the new rank for the first task to cause the first client to re-rank the first task in the graphical user interface based on the new rank.

The data processing system 202 can include a card generator 210 designed, constructed and operational to provide data to a current user with information about the task established by the data processing system 202 for the current user. The card generator 210 can provide a notification with the information to a client device 222 to cause the client device 222 to render or otherwise present a rank for the task assigned to a user of the client device 222. For example, the card generator 210 can provide instructions to the client device 222 to cause the client device 222 to generate a graphical user interface indicating the information about the task. The card generator 210 can generate various types of graphical user interfaces or audio output interfaces configured to present task information to users. Graphical user interfaces can include or provided via a feed card, list, prompt, pop-up window, webpage, SaaS application, or other program or system. Example graphical user interfaces that can be generated or otherwise provided by the data processing system 202 are illustrated in FIGS. 3A-3J.

Figure 3A:
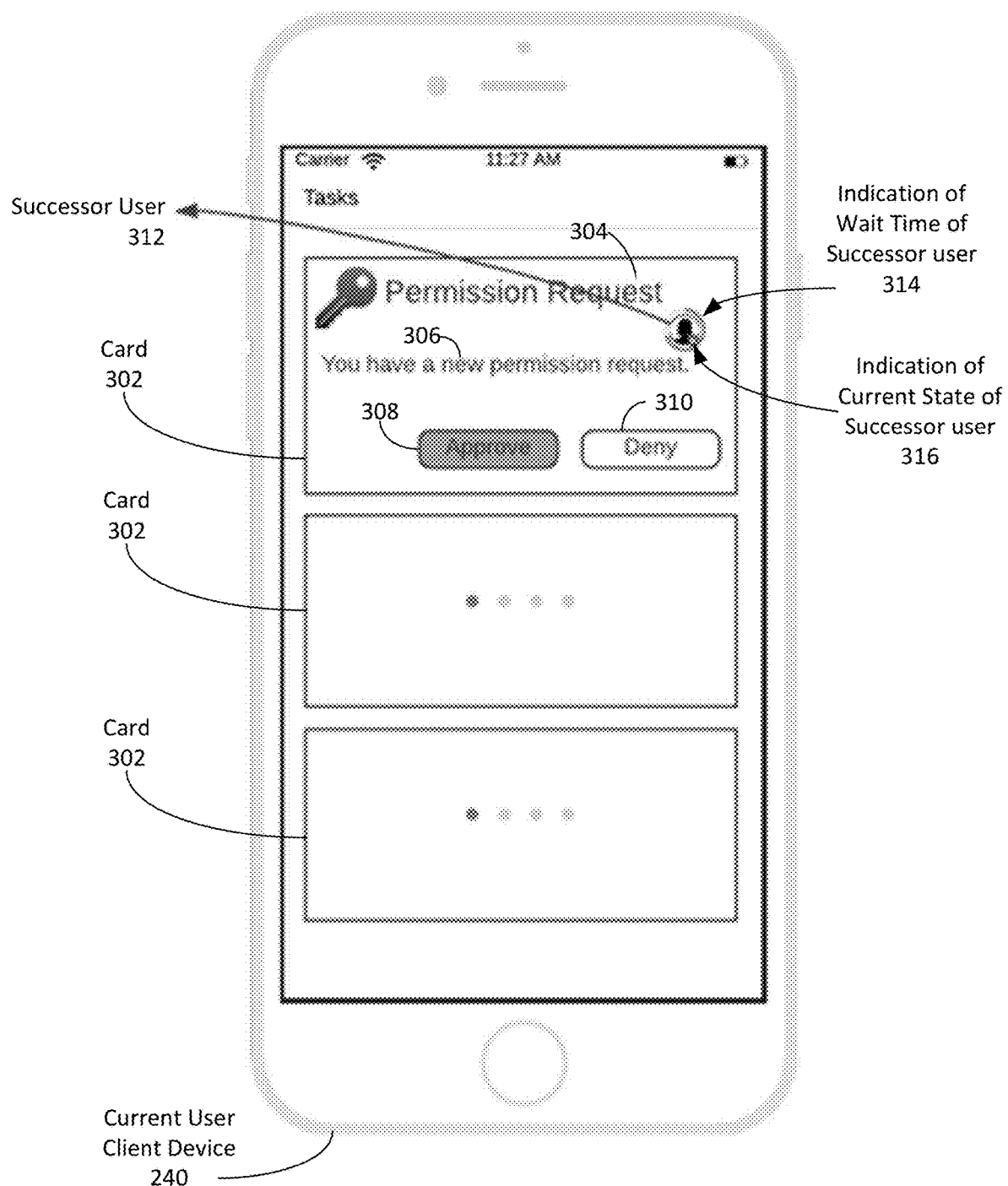

The card generator 210 can provide, to a client device 222, data including the rank for the first task to the current user. The card generator 210 can further provide information about the state of a successor user (e.g., a second client device 222 of the successor user assigned to a subsequent task) to cause the first client device 222 to generate a graphical user interface that indicates the rank of the first task and an indication of the state of the second client, such as depicted in FIG. 3A.

The card generator 210 can provide state information such as an amount of time successor has been ready or available to perform a task. The card generator 210 can generate an icon that indicates the amount of time as depicted in FIG. 3A, for example. The card generator 210 can use colors, symbols, shapes, shading, or other graphical elements to depict the amount of time a successor user has been in a ready state. The card generator 210 can provide an instruction to the client device 222 to update the graphical user interface to indicate the amount of time a successor user has been in the ready state.

In some cases, the data processing system 202 can provide information to a predecessor user that has already completed a task. The data processing system 202 can provide information to a successor user about the predecessor user. Thus, the data processing system 202 can provide information about one or more users prior to or subsequent to the current user in the digital workflow. For example, the information can include state information about a successor user that may or may not have yet completed a task. For example, the data processing system 202 can receive an indication of completion of the first task by the first user. The data processing system 202 can receive an updated state of the first client device 222 that previously completed the first task. The data processing system 202 can provide, to the successor user, information indicating the second task and the updated state of the first client to cause the second client to generate a graphical user interface displaying the second task and the updated state of the first client.

The data processing system 202 can include a communicator 208 designed, constructed and operational to allow users to communicate with one another or post messages on a messaging board maintained by the data processing system 202 or a SaaS application 228. The communicator 208 can establish a text-based asynchronous communication between two or more client devices 222. The communicator 208 can establish a voice-based communication between two or more client devices 222. The communicator 208 can include or utilize an e-mail application or chat application to establish a communication between two or more client devices 222 or users thereof. The data processing system 202 can provide a graphical user interface element, button or other widget that the user can interact with in order to establish a communication with another user as depicted in FIG. 3I.

The data processing system 202 can provide notifications to client devices 222 responsive to a request from the client device 222, or responsive to an event or condition associated with the digital workflow. The data processing system 202 can provide a notification to a client device 222 responsive to completion of a task in the digital workflow, or responsive to a state update for a client device 222 associated with a task in the digital workflow. For example, when a first user completes a task, the data processing system 202 can receive an indication that the first user completed the task. The data processing system 202, responsive to the indication that the first user completed the task, provide a notification to the second user that is a successor user to the first user that the second task that is subsequent to the first task is ready to be performed by the second user. The second user can become the new current user, and the data processing system 202 can determine a rank for the second task for the second user based on state information associated with any successor users that are subsequent to the second user, which can be the new current user. The data processing system 202 can further provide, to the second client device, state information associated with the first user. The second client device 222 can display the state information associated with the first user. The second client device 222 can further display a communication icon to allow the second user to communicate with the first user. Thus, the data processing system 202 can provide, to the second client device, responsive to completion of the first task by the first user, information including the second task and an updated state of the first client. The second client device 222 generate a graphical user interface displaying the second task, the updated state of the first client device 222, and a communication icon configured to establish a communication channel between the second client device 222 and the first client 222. The second user can invoke the communication channel in order to communicate with the first user. The data processing system 202 can receive a request to establish the communication channel between the second client device 222 and the first client device 222 that previously performed the first task, and establish the communication channel (e.g., a chat window, e-mail, or voice-based call).

The data processing system 202 can provide state information and communication information for one or more previous users or one or more successor users. For example, the data processing system 202 can identify a third task of the sequence of tasks and a third user associated with a third client device 222 of the group of client devices that is assigned to perform the third task. The third task can be subsequent to the second task. The data processing system 202 can retrieve, subsequent to completion of the second task, the state of the first client device 222, the state of the second client device 222, information associated with performance of the first task by the first user, and information associated with performance of the second task by the second user. The data processing system 202 can provide, to the third client device, a graphical user interface card configured to display the state of the first client device, the state of the second client device, the information associated with performance of the first task by the first user, the information associated with performance of the second task by the second user, and an icon configured to initiate a communication channel between the third client device 222 and at least one of the first client device 222 or the second client device 222. An example graphical user interface depicting multiple users and an ability to communicate with the multiple users is depicted in FIG. 3J.

The data processing system 202 can include or provide a virtual digital assistant 212 designed, constructed and operational to facilitate the user in performing a task assigned to the user. The virtual digital assistant 212 can automatically perform a portion or all of a task assigned to user. The virtual digital assistant 212 can be configured with rules, policies, or a machine learning model in order to perform at least a portion of a task on behalf of a user. The data processing system 202 can trigger the virtual digital assistant 212 to perform at least a portion of a task based on a condition or trigger event.

The virtual digital assistant 212 can include program, code, scripts, rules, natural language processing capabilities, or a machine learning engine. The virtual digital assistant 212 can be configured with policies, instructions, or a machine learning model. The virtual digital assistant 212 can receive or detect instructions to perform a task, and automatically perform the task on behalf of a user. The virtual digital assistant 212 can communicate with one or more component, server or device of system 200.

The data processing system 202 can determine to use the virtual digital assistant 212 to perform the task based on an event. The data processing system 202 can trigger, invoke, launch or otherwise cause the virtual digital assistant 212 to perform a task response to an even or trigger condition. The data processing system 202 can instruct the virtual digital assistant 212 to perform at least a portion of a task responsive to detecting the event or trigger condition. The event can include or be based on one or more of state information associated with a current user or one or more successor users, a ready time of one or more successor users being greater than a threshold, a type of task, a number of successor users that are ready and online being greater than a threshold, an urgency or priority level of the task.

For example, the state service 206 can determine state information of the current user and one or more successor users. The state service 206 can determine that a first user (or any current user) is away, offline, or otherwise unavailable to perform a current task that is ready for the first user to perform based on state information associated with the first user. The state service 206 can further determine that at least one successor user in the digital workflow is available and ready to perform any second task that is subsequent to the current task. The state service 206 can determine to provide the state information of the current user and the one or more subsequent users to the virtual digital assistant 212. The state service 206 can further determine to instruct the virtual digital assistant 212 to perform the current task on behalf of the current user. The state service 206 can determine to instruct the virtual digital assistant 212 to perform the current task responsive to determining that the first user is offline and there are one or more successor users that are ready and available to perform a subsequent task that depends on the first task being completed. The state service 206 can determine to instruct the virtual digital assistant 212 to perform the current task on behalf of the current user in order to reduce delay in completion of the digital workflow. By having the virtual digital assistant 212 perform the current task, the client devices of the subsequent users may remain idle for a shorter duration while waiting for the current user to perform the task, thereby reducing wasted computing resource utilization.

The state service 206 can determine to instruct the virtual digital assistant 212 to perform the current task of the current user responsive to the number of successor users that are ready to perform the respective subsequent tasks satisfying a threshold. For example, if the number of successor users that are ready is greater than or equal to a threshold such as 1, 2, 3, 4, 5 or more users, then the state service 206 can determine to instruct the virtual digital assistant 212 to perform the task on behalf of the current user that is the cause of the delay.

The state service 206 can determine to instruct the virtual digital assistant 212 to perform the task of the current user based on the amount of time one or more successor users have been ready satisfying a threshold. For example, the state service 206 can determine to instruct the virtual digital assistant 212 to perform the current task on behalf the current user responsive to the amount of time a successor user has been waiting being greater than or equal to a duration threshold such as 5 minutes, 6 minutes, 6 minutes, 10 minutes, 15 minutes, 20 minutes, 30 minutes, 60 minutes, 90 minutes, 2 hours, 3 hours, 4 hours, 5 hours or some other amount of time. The state service 206 can aggregate the amount of time multiple successor users have been ready and waiting for the current user and determine to instruct the virtual digital assistant 212 to perform the current task responsive to the combined aggregated time being greater than or equal to the duration threshold. In some cases, the state service 206 can determine an average wait time based on the total aggregated wait time divided by the number of successor users, and instruct the virtual digital assistant 212 to perform the task responsive to the average wait time being greater than or equal to the duration threshold.

The state service 206 can determine to instruct the virtual digital assistant 212 to perform the task based on the type of task. The state service 206 can determine to instruct the virtual digital assistant 212 to perform the task based on the type of task and the duration threshold. For example, the state service 206 can determine the type of task is one that the virtual digital assistant 212 is authorized to perform on behalf of the current user. The current user can establish a profile in the user information data structure 218 that indicates types of tasks the current user has authorized a digital virtual assistant to perform based on a trigger condition or event. The type of task can correspond to approving a request to update an application, replace a desktop computer, reset a password for a SaaS application, or other type of task. The current user may authorize the virtual digital assistant 212 to perform types of tasks that the virtual digital assistant 212 can reliably perform without introducing any errors or faults. The current user may authorize the virtual digital assistant 212 to automatically perform those types of tasks that are not susceptible to abuse or malicious activity (e.g., automatically approve a request to download and install a free software program that is on a trusted white list of applications that has been previously approved by an administrator of the data processing system 202, but do not automatically approve a request to download and install a costly application for which the data processing system 202 does not have a license and has not been previously installed on the group of client devices 222).

The data processing system 202 can determine to invoke the virtual digital assistant 212 to perform the task based on an urgency or priority level of the task. If the current task is a highest ranked task, then the data processing system 202 can determine whether the task meets the other criteria (e.g., duration threshold, type of task, and policy of current user) before determining to invoke the virtual digital assistant 212 to perform the task. Thus, the current user can establish rules or policies that instruct the data processing system 202 as to when to invoke the virtual digital assistant 212 to automatically perform a task based on one or more of the type of task, duration threshold, and rank or priority of the current task.

In some cases, the virtual digital assistant 212 can utilize a machine learning model to determine when to automatically perform a task, and how to perform the task. The virtual digital assistant 212 can use a machine learning technique to train a model based on historical task performance data. The historical task performance data can include types of tasks and types of actions performed by the user to complete the tasks. The historical task performance information can include further input, such as input responsive to a prompt by the data processing system 202 as to whether the current user would have authorized a virtual digital assistant 212 to perform that task on behalf of the user. The machine learning model can include features such as type of task, rank of task, user info, wait time, or other information and correlate it with a binary output as to whether or not to automatically perform a task given the set of input conditions. The machine learning model can be specific to the current user and predict whether the current user would have authorized the virtual digital assistant 212 to automatically perform the task on behalf of the user, as well has how the current user would have performed the task. For example, if the current task was to approve a request to install the latest version of a word processing application that has been previously authorized by an administrator, then the model trained based on historical task performance information can predict with a with a high likelihood that the current user would approve that request.

Figure 2B:
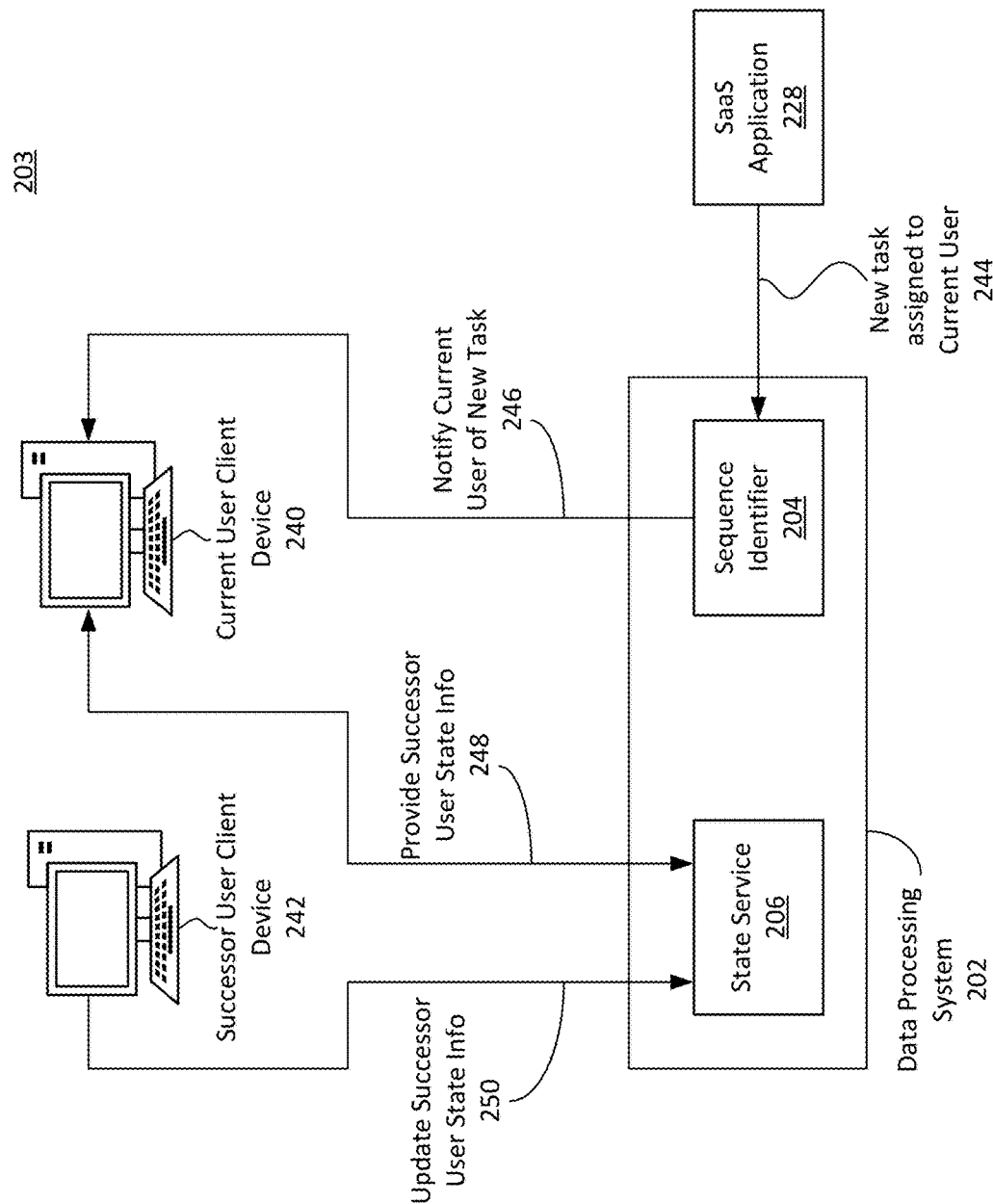
FIGS. 2B-2C depict block diagrams of an operation of a system to prioritize sequential application tasks, in accordance with implementations.

FIG. 2B depicts a block diagram of an operation of a system to prioritize sequential application tasks, in accordance with an implementations. The system 203 depicted in FIG. 2B can include or interface with one or more component, function or device depicted in FIG. 2A, including, for example, data processing system 202, state service 206, sequence identifier 204, and SaaS application 228. The data processing system 202 can communicate with a current user client device 240 and a successor user client device 242. The current user client device 240 and successor user client device 242 can include one or more component or functionality of client device 222 depicted in FIG. 2A.

At ACT 244, the SaaS application 228 can assign a new task to the current user client device 240. The SaaS application 228 can push the new task to the data processing system 202 (or sequence identifier 204), transmit the task responsive to a request from the data processing system 202, or otherwise provide the notification of the new task to the data processing system 202. The SaaS application 228 can include, along with the indication of the new task, information about the task, and one or more successor users for the task. For example, the SaaS application 228 can provide a digital workflow that includes a sequence of tasks that includes the new task.

At ACT 246, the data processing system 202 (or sequence identifier 204) can provide a notification to the current user client device 240 about the new task provided by the SaaS application 228. The current user client device 240 can present for display via a display device of the client device 240 the notification of the new task.

At ACT 248, the current user client device 240 can provide state information to the data processing system 202 (e.g., state service 206). The current user client device 240 can provide the state information based on a time interval, responsive to a change in state, responsive to being assigned the new task, or responsive to a request from the data processing system 202 for state information. Also at ACT 248, the state service 206 can provide state information about the successor user client device 242 to the current user client device 240 to allow the current user client device 240 to display the state information. The current user client device 240 (or state service 206) can rank the new task for the current user client device 240 based on the successor user state information (e.g., assign a higher rank if the successor user is ready to perform the subsequent task).

At ACT 250, the successor user client device 242 can provide updated state information about the successor user client device 242 to the state service 206. The successor user client device 242 can provide the updated state information based on a time interval, responsive to a change in state, or responsive to a request from the data processing system 202 for state information. The state service 206, responsive to receiving the updated state information from the successor user client device 242, can provide the updated state information to the current user client device 240 to cause the current user client device 240 to update a rank for the current task, or other provide an updated indication of the state of the successor user client device.

Figure 2C:
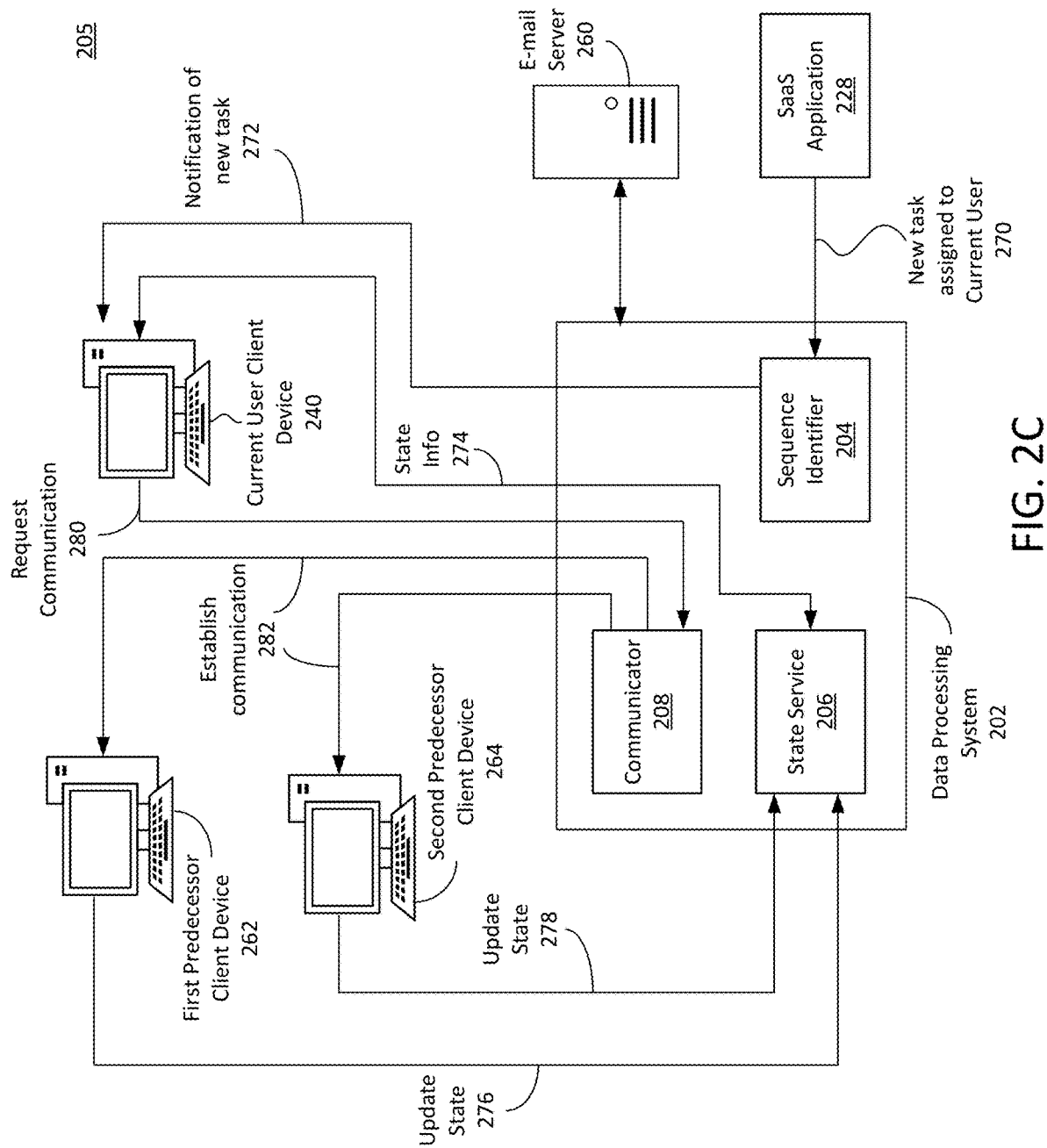

FIG. 2C depicts a block diagram of an operation of a system to prioritize sequential application tasks, in accordance with an implementations. The system 205 depicted in FIG. 2C can include or interface with one or more component, function or device depicted in FIG. 2A or 2C, including, for example, data processing system 202, state service 206, sequence identifier 204, SaaS application 228, communicator 208 and current user client device 240. The data processing system 202 can communicate with a current user client device 240, a SaaS application 228, an e-mail server 260, a first predecessor client device 262, and a second predecessor client device 264. The first predecessor client device 262 and second predecessor client device 264 can include one or more component or functionality of client device 222 depicted in FIG. 2A.

At ACT 270, the SaaS application 228 can provide an indication to the data processing system 202 (e.g., via sequence identifier 204) of a new task assigned to the current user client device 240. The sequence identifier 204 can receive information about a digital workflow that includes the new task, or a sequence of tasks that includes the new task. The new tasks may not be an initial task in the digital workflow or sequence of tasks. For example, there may be one or more predecessor users that performed tasks in the digital workflow prior to the new task being assigned to the current user. The new task may be assigned to the current user client device 240 responsive to the predecessors client devices 262 and 264 completing the previous tasks.

At ACT 272, the data processing system 202 (e.g., via sequence identifier 204) can notify the current user client device 240 of the new task. The sequence identifier 204 can further provide information about the predecessor users 262 and 264. The current user client device 240 can display a card or other type of notification that includes the new task as well as information about the predecessors 262 and 264 that performed prior task in the digital workflow.

At ACT 274, the current user client device 240 can provide state information to the state service 206, as well as receive state information from the state service 206. For example, the state service 206 can provide state information associated with the first predecessor client device 262 and the second predecessor client device 264.

At ACT 276, the state service 206 can received an update to the state information from the first predecessor client device 262. At ACT 278, the state service 206 can received an update to the state information from the second predecessor client device 264. The data processing system 202 can receive the updated state information responsive to a change in state, request, or time interval. The state service 206 can provide the updated state information to the current user client device 240 to cause the current user client device 240 to update a card or other graphical user interface to display the updated state information.

At ACT 280, the current user client device 240 can request a communication with one or more of the first predecessor client device 262 or second predecessor client device 264. For example, the card displayed by the current user client device 240 can include a button, widget or other interactive user interface that allows the current user to communicate with a predecessor client device. The mode of communication can include chat application, text, simple messaging script text message, phone call, post to an electronic message board, or an e-mail. The communicator 208 can receive the request for the communication, and establish the communication.

At ACT 282, the communicator 208 can establish or provide the communication to one or more of the first or second predecessor client devices 262 or 264. In some cases, depending on the selected mode of communication, the communicator 208 can utilize an e-mail server 260 to send an e-mail corresponding to the communication requested by the current user client device 240.

FIGS. 3A-3J depict example graphical user interfaces for providing a prioritization of sequential application tasks, in accordance with implementations. The graphical user interfaces can be provided by one or more system, component or device depicted in FIG. 2A, 2B or 2C, including, for example, data processing system 202, sequence identifier 204, state service 206, communicator 208, card generator 210, virtual digital assistant 212, client device 222, or SaaS application 228. The data processing system 202 can provide information to a client device 222 to cause the client device 222 to render, display, or otherwise provide the graphical user interface depicted in FIGS. 3A-3J.

FIG. 3A depicts an example graphical user interface for providing a prioritization of sequential application tasks, in accordance with an implementation. A current user client device 240 can generate a graphical user interface including a card 302. The client device 240 can display multiple cards 302. The cards can be referred to or include feed cards, such as resource feeds 506. The client device 302 can display the cards based on a rank or priority of the task. For example, the client device 302 can display the highest ranking card at the beginning of the task list or at the top of the task list or top of a display device. Each card 302 can correspond to a different task assigned to the current user. Each different task can correspond to a different digital workflow or sequence of tasks. The card 302 can include an indication for the type of task 304, such as "permission request". The card 302 can include a description of the task 306, such as "you have a new permission request." The card 302 can include user interface buttons such as an approve button 308 and a deny button 310. The current user can either approve or deny the permission request using buttons 308 or 310.

The data processing system 202 can further provide the current user device 240 with information about a successor user 312. The data processing system 202 can provide information about the wait time of the current user and a state of the current user. The client device 240 can display, via card 302, the successor user icon 312, along with an indication of the wait time 314 of the successor user 312 and an indication of the current state 316 of the successor user 312. The data processing system 202 can cause the client device 240 to display any type of graphical user interface to display the indication of the wait time 314 or the indication of the current state 316 of the successor user 312. For example, to provide the indication of the state 316, the card 302 can display a color corresponding to a state, such as green for ready or available, yellow for away, red for busy, and black for offline. To provide the indication of the wait time 314 (e.g., the amount of time the successor has been waiting for the current user to complete the current task), the card 302 can display a circle with a circumference that is partially highlighted based on the amount of time that has elapsed. For example, 75% of the circumference can be highlighted to indicated that 75% of an hour, or 75% of a day have elapsed since the successor has been waiting for the current user to complete the task.

Figure 3B:
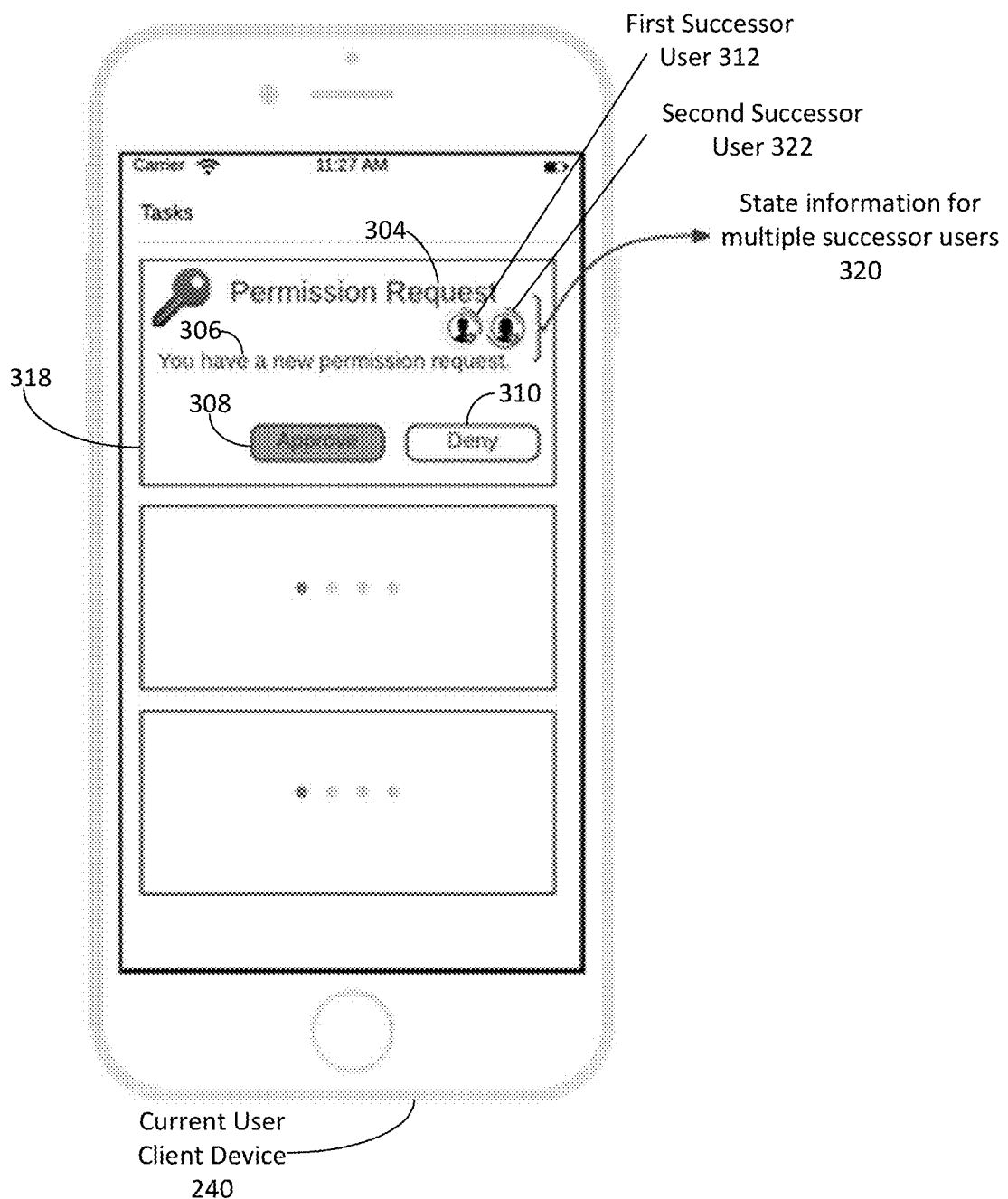

FIG. 3B depicts an example graphical user interface for providing a prioritization of sequential application tasks, in accordance with an implementation. The current user client device 240 can display one or more graphical user interface cards 318. The graphical user interface card 318 can display one or more successor users based on the digital workflow assigned to the current user. For example, the digital workflow can include a current task, a first subsequent task to be performed by a first successor user 312, and a second subsequent task to be performed by a second successor user 322. The card 318 can display icons or avatars for the first and second successor users 312 and 322 along with state information and wait time information for the multiple successor users 320. The order in which the successor user icons are displayed in card 318 can indicate the order of succession. For example, the left most icon can indicate the first successor user 312.

Figure 3C:
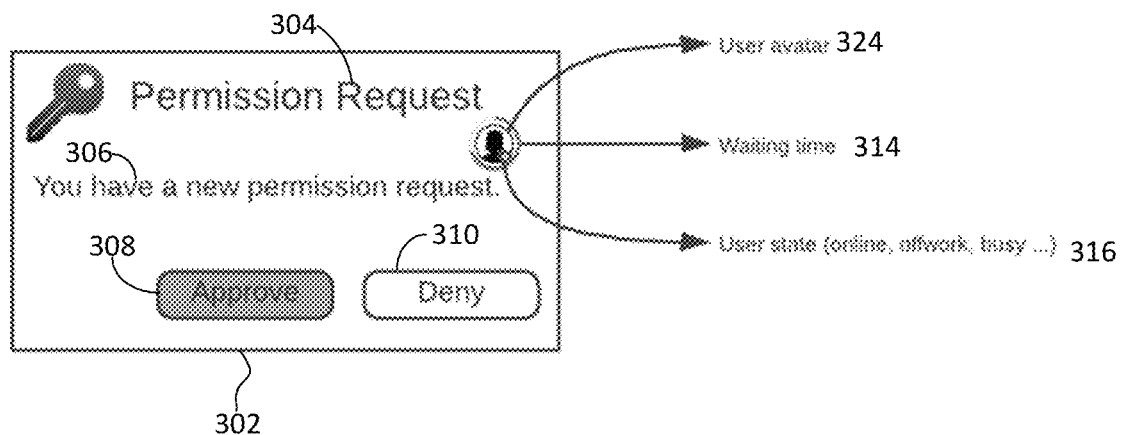

FIG. 3C depicts an example graphical user interface for providing a prioritization of sequential application tasks, in accordance with an implementation. The card 302 depicted in FIG. 3C illustrates a user avatar 324, a waiting time 314, and a user state 316 (e.g., online, off-work, busy, ready, away, etc.). The data processing system 202 can provide the information to the client device 240 to cause the client device 240 to generate a graphical user interface for the card 302.

Figure 3D:
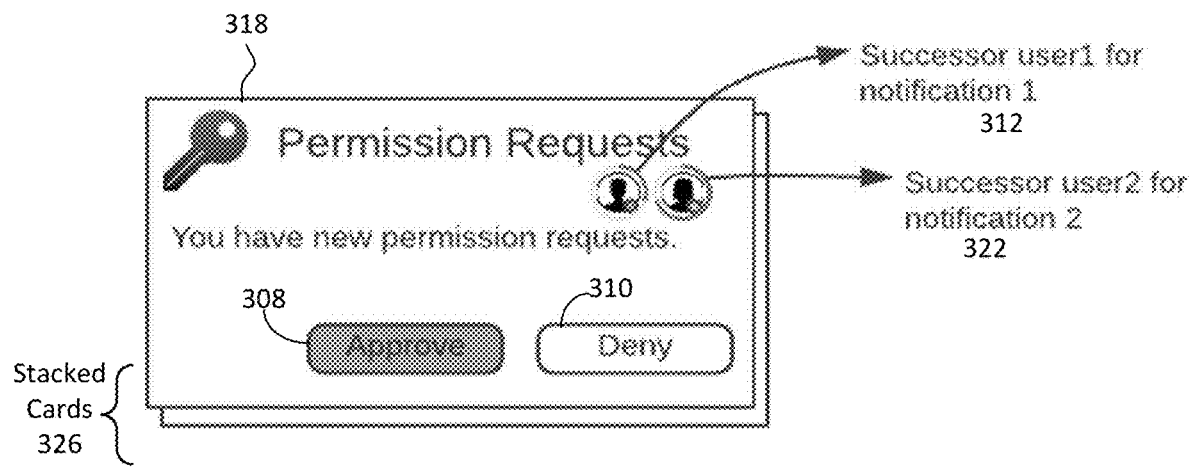

FIG. 3D depicts an example graphical user interface for providing a prioritization of sequential application tasks, in accordance with an implementation. Card 318 includes information for multiple successor users 312 and 322. The client device 240 can generate the card 318. The client device 240 can generate multiple cards 318 or 302 and provide a stacked cards 326 interface that collapses the multiple cards on top of each other in a manner that obfuscates the other cards. The client device 240 can display the top card 318 based on a rank or priority of the card 318.

Figure 3E:
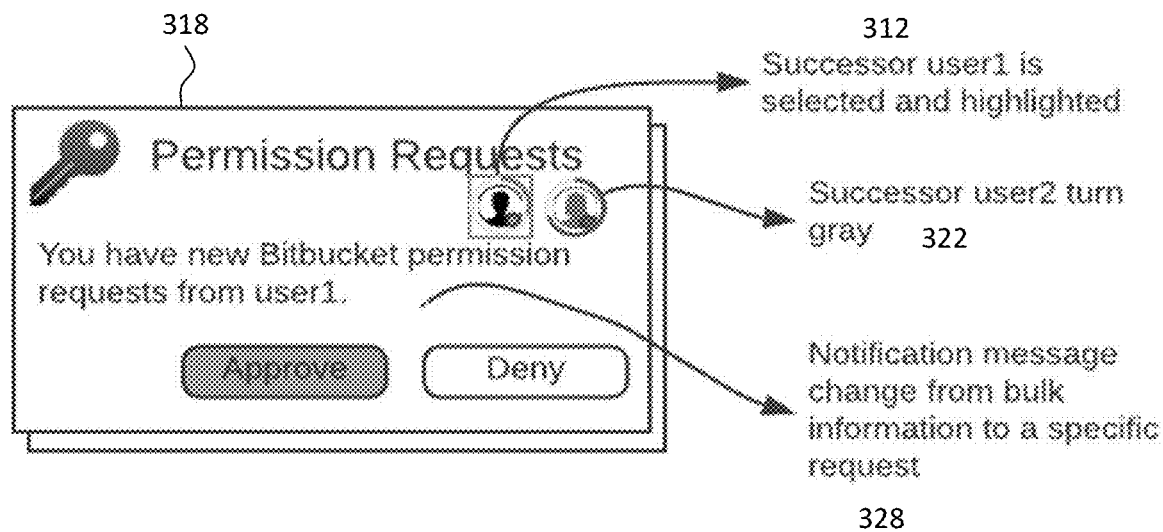

FIG. 3E depicts an example graphical user interface for providing a prioritization of sequential application tasks, in accordance with an implementation. The card 318 can indicate one or more successor users 312 and 322 and provide an interactive user interface via which the current user can interact or manipulate the icons or avatars for the successor users 312 and 322. For example, selecting the avatar for the first successor user 312 can result in the icon 312 being highlighted or selected, while the icon 322 turns gray. Selecting the icon can change the notification message 328 to a message that is specific to the highlighted user, such as a specific permission request from the selected user.

Figure 3F:
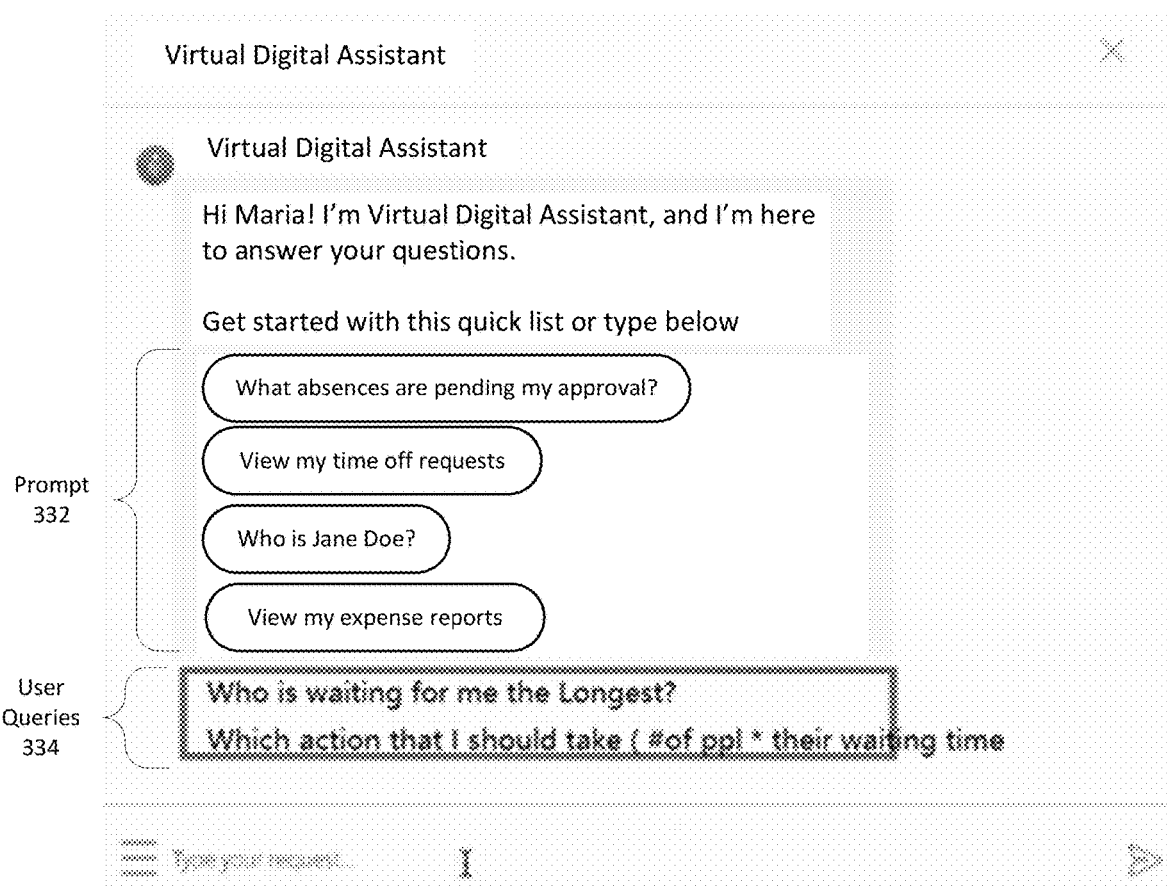

FIG. 3F depicts an example graphical user interface for providing a prioritization of sequential application tasks, in accordance with an implementation. FIG. 3F depicts a graphical user interface 330 for a virtual digital assistant. The graphical user interface can be provided via virtual digital assistant 212. The data processing system 202 can invoke the virtual digital assistant 212 automatically. A user, via client device, can invoke the virtual digital assistant 212. The virtual digital assistant 212 can provide a prompt with types of requests the user can make of the virtual digital assistant 212, such as "what absences are pending my approval," view my time off requests," "who is Jane doe," or "view my expense reports." The virtual digital assistant 212 can customize the prompts for the current user based on the current tasks that are ready for the current user to perform. The user can input queries 334 such as "who is waiting for me the longest?" or "which action should I take?" The action the user should take can be based on the amount of time a successor user has been waiting for the user to perform the action, or based on the number of successor users and amount of time they have been waiting. The amount of time can be the number of successor users multiplied by the amount of time they have been waiting for the current user to perform the task.

Figure 3G:
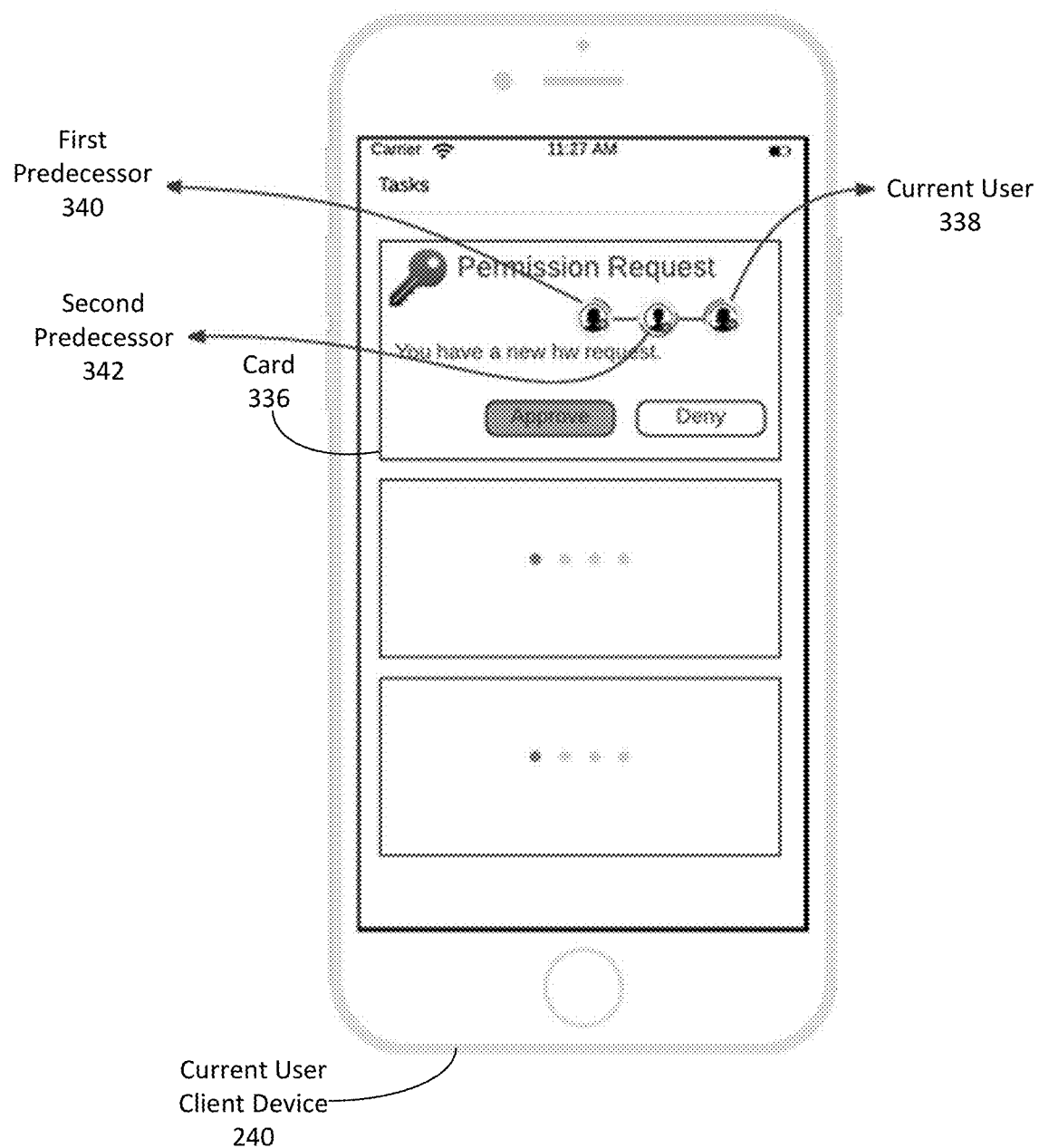

FIG. 3G depicts an example graphical user interface for providing a prioritization of sequential application tasks, in accordance with an implementation. Card 336 can include an icon for the current user 338, as well as a first predecessor user 340 and a second predecessor user 342. The predecessors users 340 and 342 can refer to users in the digital workflow that performed tasks prior to the task assigned to the current user 338. The card 336 can similarly include state information or time information for the predecessor users. The state information can reflect whether the users are online, offline, ready, idle, away, off work, or other state information. The time information can indicate how long ago the predecessor user completed their task in this digital workflow.

Figure 3H:
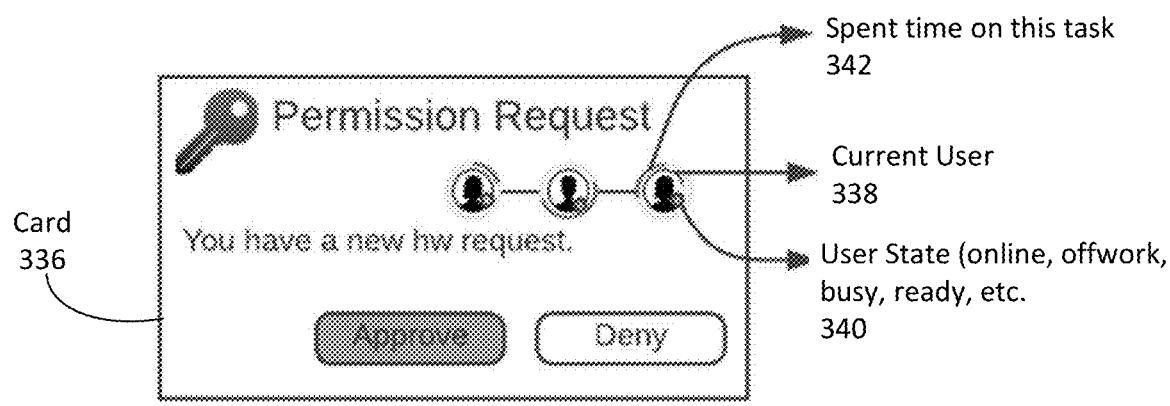
Figure 31:
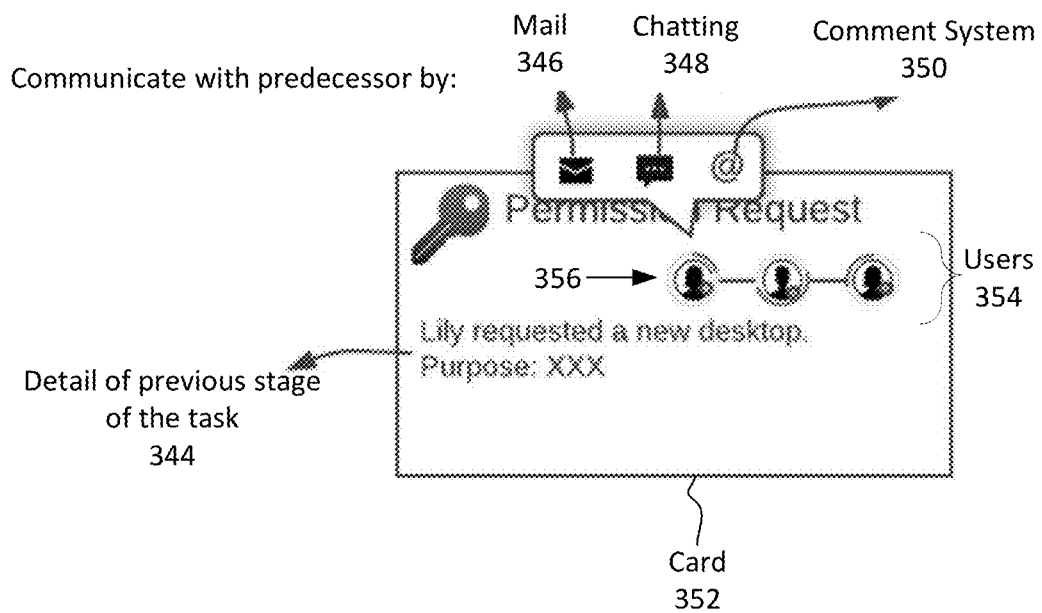
Figure 3J:
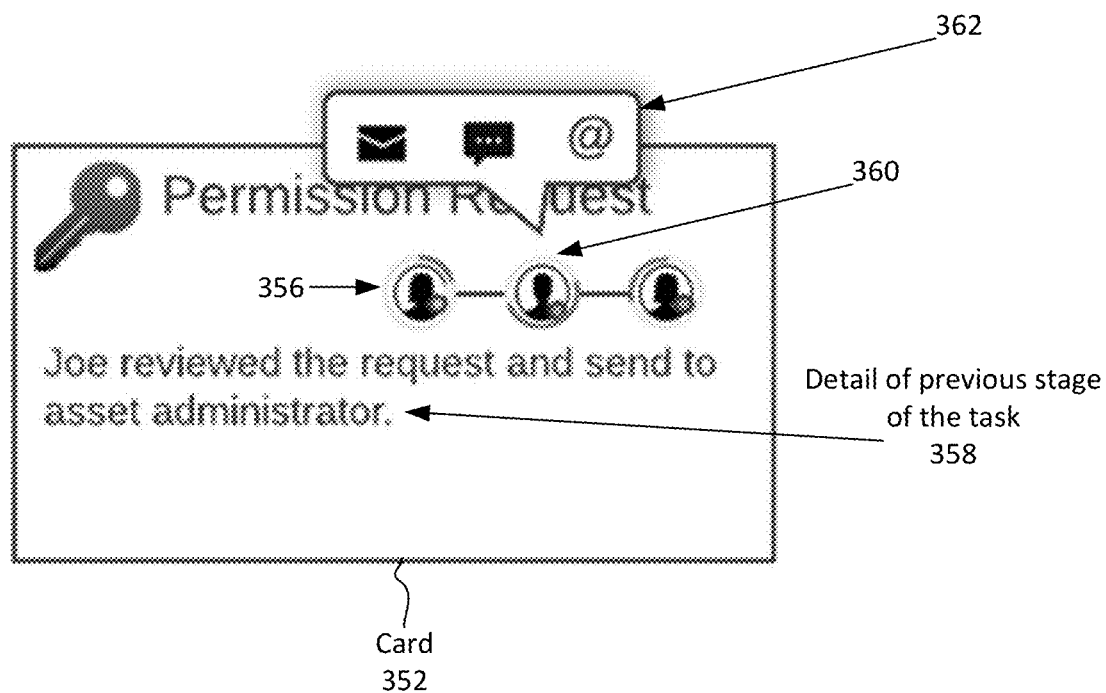

FIG. 3H depicts an example graphical user interface for providing a prioritization of sequential application tasks, in accordance with an implementation. In card 336, the current user 338 avatar can provide additional information about the user's state 340 and the amount of time the user spent on this task 342. The amount of time can refer to the amount of time the task has been assigned to the user to perform, or the amount of time the current user has been actively performing the task. The data processing system 202 can determine a timestamp for when the current task became ready for the current user to perform, and update the indicator 342 to reflect the amount of time that has elapsed since the user could perform the task. In some cases, the data processing system 202 can begin the accruing time based on when the current user indicates they have begun working on the task (e.g., when they accept the task or otherwise interact with card 336 to provide an indication they are working on the task).

FIG. 3I depicts an example graphical user interface for providing a prioritization of sequential application tasks, in accordance with an implementation. Card 352 can display icons for multiple users 354. The users 354 can include one or more of a current user, predecessor user, or successor user of the digital workflow. Responsive to selection of a predecessor user 356, the card can display a message 344 with details of a previous stage of the task. The card 352 can further display, responsive to selection of the predecessor user 356, a communication interface with different modes of communication by which the current user can communicate with the selected predecessor user 356. The modes of communication can include, for example, e-mail 346, chat application 348, or a comment system 350. Selecting the mode of communication can cause the communicator 208 of the data processing system 202 to provide a message or communication.

FIG. 3J depicts an example graphical user interface for providing a prioritization of sequential application tasks, in accordance with an implementation. Card 352 illustrates message 358 changing responsive to the user selecting icon 360 for a different predecessor or successor user relative to icon 356. Upon selecting icon 360, the card 352 can display communication modes 362 to allow the user to communicate with user 360.

Figure 4A:
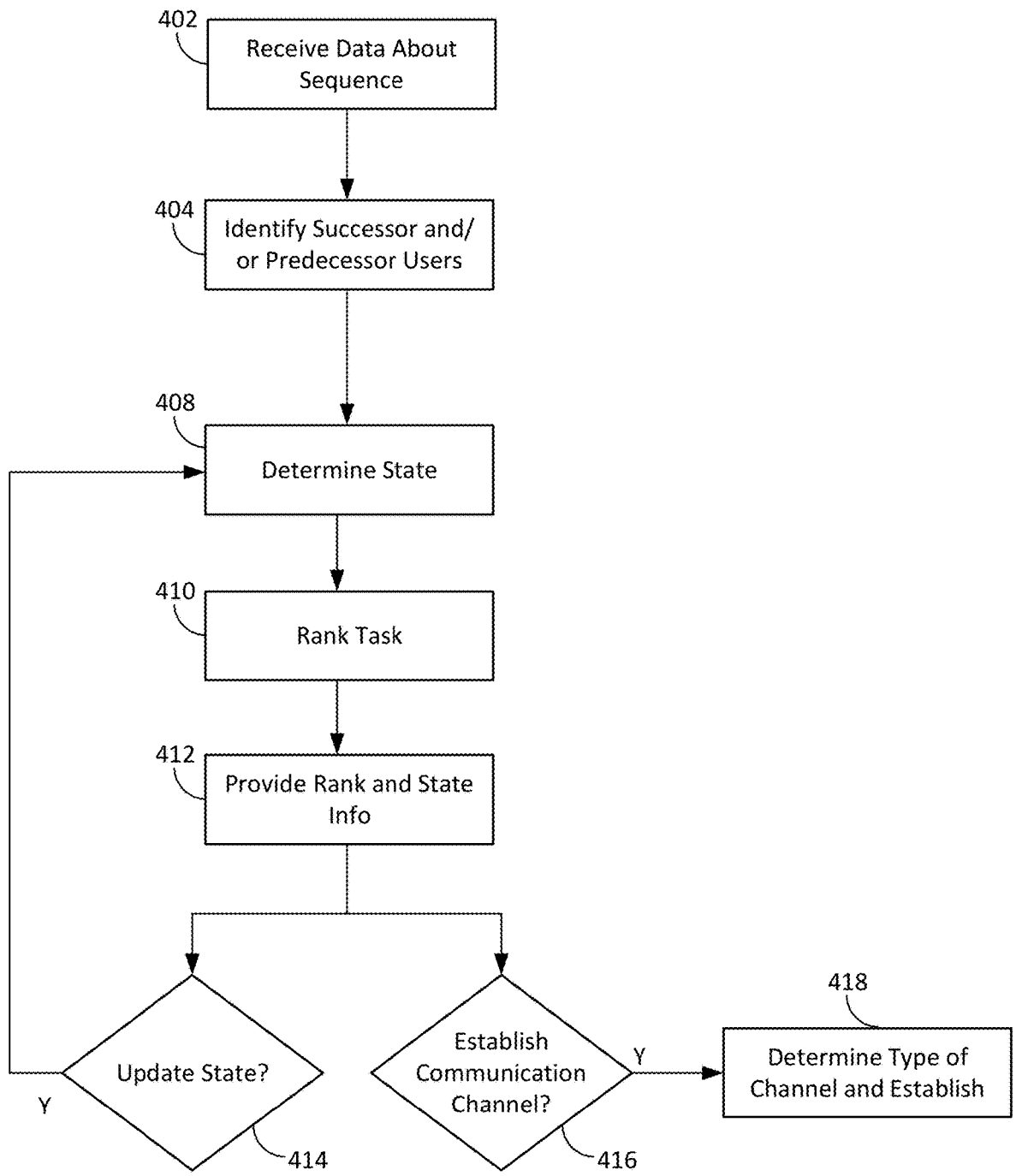
FIG. 4A depicts an example method of prioritizing sequential application tasks, in accordance with an implementation.

FIG. 4A depicts an example method of prioritizing sequential application tasks, in accordance with an implementation. The method 400 can be performed by one or more system, component, or device depicted in FIG. 1A, 1B, 2A, 2B, 2C, 5A, 5B, or 5C, including, for example, a data processing system 202, client device, or SaaS application. In brief overview, the data processing system receives data about a sequence of tasks at ACT 402. At ACT 404, the data processing system can identify successor and or predecessor users in the sequence of tasks. At ACT 408, the data processing system can determine a state of the current user or one or more predecessor or successor users. At ACT 410, the data processing system can rank the task for the current user. At ACT 412, the data processing system can provide the rank and state information to the client device. At decision block 414, the data processing system can determine whether to update states of users. At decision block 416, the data processing system can determine whether to establish a communication channel. At ACT 418, the data processing system can determine the type of communication channel to establish and then establish the communication channel.

Still referring to FIG. 4A, and in further detail, the data processing system receives data about a sequence of tasks at ACT 402. The data processing system 202 can receive, from an application, data about a sequence of tasks to be performed by a plurality of users using a plurality of clients. The application can be a SaaS application executing on the data processing system or on a server remote from the data processing system. The SaaS application can be provided by a third-party entity different from the entity providing the data processing system. The data processing system can receive the data responsive to a request. In some cases, the application can push the data about the sequence of tasks to the data processing system. The application can determine there is a new task or new sequence of tasks, and transmit the new task to the data processing system.

The data can include a digital workflow that includes information about the sequence of tasks, relationship or dependencies between tasks, and users that are assigned to perform each of the tasks. The digital workflow can include a deadline for completion of the task, the types of tasks, and other information that facilitates performance or completion of the tasks.

At ACT 404, the data processing system can identify successor and/or predecessor users in the sequence of tasks. The data processing system can identify successor users by parsing the digital workflow to determine which task in the sequence of tasks is assigned to the current user. Based on the task that is assigned to the current user, the data processing system can then determine subsequent tasks that depend on the current task assigned to the current user. The data processing system can then identify the successor users assigned to the subsequent tasks. Similarly, to the extent there are any predecessor users that performed tasks prior to the current task assigned to the current user, the data processing system can identify the predecessor users. For example, the data processing system can identify a first user from the plurality of users to perform a first task in the sequence of tasks, and a second user from the plurality of users to perform a second task in the sequence of tasks that is subsequent to the first task.

At ACT 408, the data processing system can determine a state of the current user or one or more predecessor or successor users. The data processing system can determine the state of the current user, predecessor user, or successor user as a ready state, online state, busy state, offline state, idle state, offwork state, etc. The data processing system can determine a state of a first client device associated with the first user and a state of a second client device associated with the second user. The data processing system can determine the state by receiving state information from an agent, monitor, application, or program executing on the client device of the respective user. In some cases, the user can provide an indicator of their current state (e.g., select via a drop down menu the user's current state). The data processing system can determine the state for one or more successor users. The data processing system can determine a wait time for the one or more successor users. The wait time can indicate the amount of time each successor user has been online and ready to perform a task relative to when the current user received the current task. In some cases, the wait time can refer to the amount of time the current user has had the task and has not yet performed it.

The data processing system can determine a total wait time by multiplying the current wait time by the number of successor users. For example, if the current user received the task at 9 AM, and there are 4 successor users, then by 10 AM if the current user has not yet completed the task the aggregated wait time is 4 hours. In another example, if only 2 of the 4 successor users were ready for that one hour, then the aggregated wait time based on the state information for each of the successor users can be only 2 hours based on the 2 successor users that were ready and available to perform the subsequent task.

At ACT 410, the data processing system can rank the task for the current user. The data processing system can establish a rank for the first task for the first user based on the state of the first client device and the state of the second client device determined at ACT 408. The data processing system can rank the task higher in the first user's task list if the second user (or successor user) has been waiting for a longer time.

ACT 412, the data processing system can provide the rank and state information to the client device. The data processing system can provide, to the first client device, data including the rank for the first task and information about the state of the second client device to cause the first client device to generate a graphical user interface that indicates the rank of the first task and an indication of the state of the second client device. The data processing system can provide a template for a card in which to display the information. The client device can receive the information and render a graphical user interface with the information. The data processing system can instruct the client device to rank the card higher or lower based on the states of the successor client devices.

At decision block 414, the data processing system can determine whether to update states of users. If the data processing system determines to receive an update to the state, the data processing system can return to ACT 408 to determine the states for the client devices, and then re-rank the task based on the states. If, at decision block 414, the data processing system determines not to update the states for any users, the data processing system can maintain the previously establish states and rank for the task.

At decision block 416, the data processing system can determine whether to establish a communication channel. The data processing system can determine to establish a communication channel responsive to a request from a current user to communicate with a predecessor user or successor user. At ACT 418, the data processing system can determine the type of communication channel to establish and then establish the communication channel. For example, the user can indicate the type of communication channel to establish, such as an e-mail, chatting application or a post to an electronic messaging service.

Figure 4B:
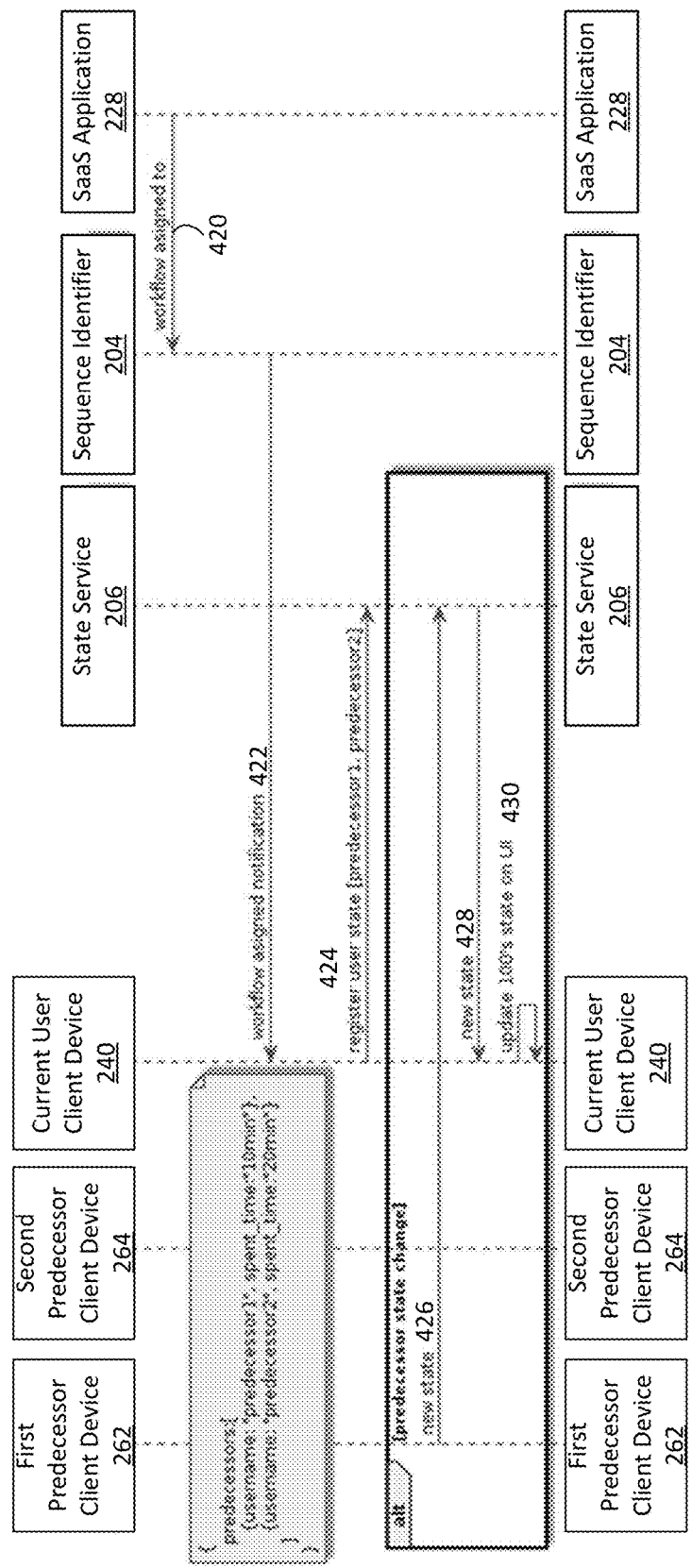
FIG. 4B-4C depict example flow diagrams for prioritizing sequential application tasks, in accordance with implementations.

FIG. 4B depicts an example flow diagram for prioritizing sequential application tasks, in accordance with an implementation. The method 401 can be performed by one or more system, component, or device depicted in FIG. 1A, 1B, 2A, 2B, 2C, 5A, 5B, or 5C, including, for example, a data processing system 202, a state service 206, sequence identifier 204, SaaS application 228, current user client device 240, second predecessor client device 264, or first predecessor client device 262. At ACT 420, the SaaS application 228 can push a workflow to the sequence identifier 204. The SaaS application 228 can provide the digital workflow including a sequence of tasks. The SaaS application 228 can provide the digital workflow responsive to a new task or new digital workflow being established.

At ACT 422, the sequence identifier 204 (or data processing system 202) can provide a notification to the current user client device 240 about the new workflow assigned by the SaaS application 228. The workflow can be provided as a workflow data structure as follows: {predecessors: [username: "predecessor1", spent time: "10 min"}, {username: "predecessor2", spent time: "20 min"}]}. The workflow data structure can include information about the predecessor users and how much time each predecessor user spent performing their respective tasks. The client device 240, responsive to receiving the workflow data structure, can update a graphical user interface card with the workflow information.

At ACT 424, the current user client device 240 can provide state information to the state service 206. The current user client device 240 can provide state information such as idle, offline, offwork hours, ready, available, online, etc. An agent executing on the client device 240 can provide the state information to the state service 206. The client device 240 can provide, along with the state information, an indication of the predecessor users 262 and 264 in the digital workflow.

At ACT 426, the state service 206 can receive an indication of a change to a state of the first predecessor client device 262. The state service 206 can receive an update to a state of the first predecessor device 262. The update can include, for example, going from an online state to an offline, for example.

At ACT 428, the state service 206, responsive to receiving the updated state information, can provide the new state to the current user client device 240. The current user client device 240, responsive to receiving the new state information from the state service 206, can update the graphical user interface to reflect the new state of the first predecessor client device 262 (e.g., as depicted in FIG. 3G) at ACT 430.

Figure 4C:
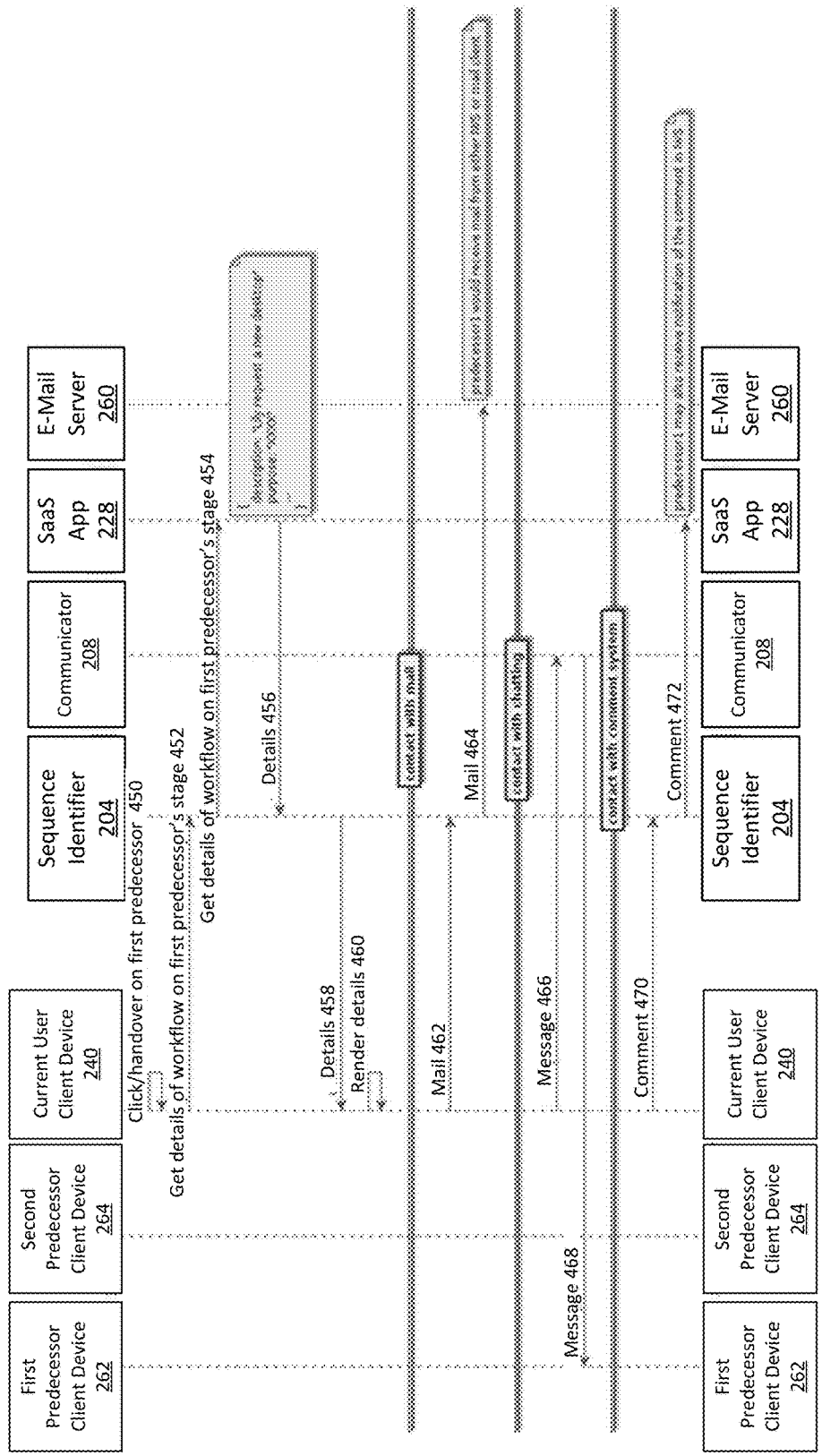

FIG. 4C depicts an example flow diagram for prioritizing sequential application tasks, in accordance with an implementation. The method 403 can be performed by one or more system, component, or device depicted in FIG. 1A, 1B, 2A, 2B, 2C, 5A, 5B, or 5C, including, for example, a data processing system 202, sequence identifier 204, communicator 208, e-mail server 260, SaaS application 228, current user client device 240, second predecessor client device 264, or first predecessor client device 262. At ACT 450, the current user client device 240 can select an icon or avatar for the first predecessor client device 262. For example, as depicted in FIG. 3I, the current user client device 240 can provide for display card 352 which includes an icon 356 for the first predecessor client device 262.

At ACT 452, responsive to the user of device 240 selecting the icon 356, for example, the device 240 can request the details of the digital workflow for the first predecessor's stage. The client device 240 can request the details of the digital workflow from the sequence identifier 204 of data processing system 202. At ACT 454, the sequence identifier 204 can forward the request to the SaaS app 228, or the sequence identifier 204 in-turn can generate a request for the workflow details and provide the request to the SaaS application 228.

At ACT 456, the SaaS application 228 can provide the request information. The SaaS application 228 can provide the request information to the sequence identifier 204 of the data processing system 202. For example, the details can include a description of the first predecessor's 262 stage such as "Lily request a new desktop"; purpose: "xxxxxx", as illustrated in card 352 depicted in FIG. 3I. At ACT 458, the sequence identifier 204 can forward the received details to the current user client device 240. At ACT 460, the current user client device can render the details as illustrated in FIG. 3I.

The current user client device 240 can communicate with the first predecessor client device 262 using e-mail, a chat application, or a comment system. For example, at ACT 462, the client device 240 can send an e-mail to the data processing system 202 (e.g., sequence identifier 204 or communicator 208). The data processing system 202 can forward the email to an e-mail server 260 at ACT 464. The e-mail server 260 can then provide the email to the first predecessor 262 either via the data processing system 202 or a separate e-mail client application executing on the first predecessor client device 262.

The current user client device 240 can communicate with the first predecessor client device 262 using a chat application. At ACT 466, the current user client device 240 can transmit a message to the communicator 208. The message can include header information indicating the source and destination of the message. The communicator 208 can then forward the message to the first predecessor client device 262 at ACT 468.

The current user client device 240 can communicate with the first predecessor client device 262 using a comment system. At ACT 470, the current user client device can post a comment to the comment system. The comment can be transmitted to the sequence identifier 204 or data processing system 202. The data processing system 202 can then forward the comment to the comment system such that the comment is received by the first predecessor client device 262.

Figure 5A:
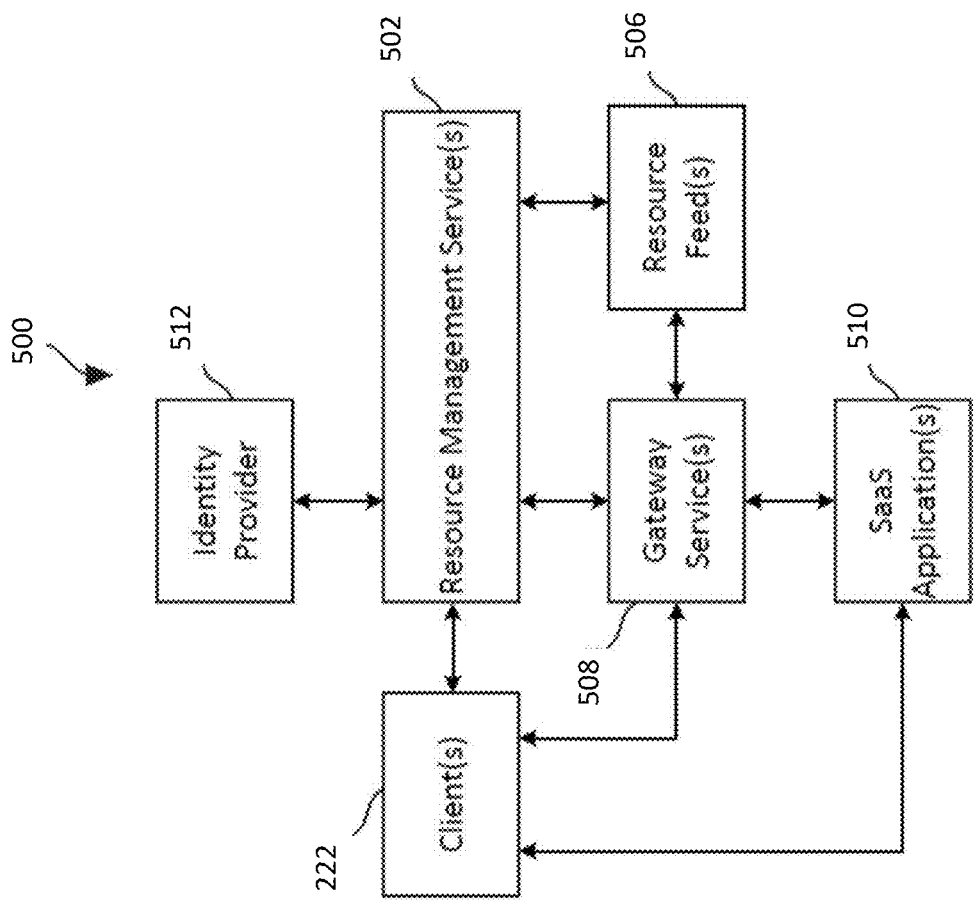
FIG. 5A is a block diagram of an example system in which resource management services may manage and streamline access by clients to resource feeds (via one or more gateway services) and/or software-as-a-service (SaaS) applications.

FIG. 5A is a block diagram of an example system 500 in which one or more resource management services 502 may manage and streamline access by one or more clients 222 to one or more resource feeds 506 (via one or more gateway services 508) and/or one or more software-as-a-service (SaaS) applications 510. In particular, the resource management service(s) 502 may employ an identity provider 512 to authenticate the identity of a user of a client 222 and, following authentication, identify one of more resources the user is authorized to access. In response to the user selecting one of the identified resources, the resource management service(s) 502 may send appropriate access credentials to the requesting client 222, and the client 222 may then use those credentials to access the selected resource. For the resource feed(s) 506, the client 222 may use the supplied credentials to access the selected resource via a gateway service 508. For the SaaS application(s) 510, the client 222 may use the credentials to access the selected application directly.

The client(s) 226 may be any type of computing devices capable of accessing the resource feed(s) 506 and/or the SaaS application(s) 510, and may, for example, include a variety of desktop or laptop computers, smartphones, tablets, etc. The resource feed(s) 506 may include any of numerous resource types and may be provided from any of numerous locations. In some embodiments, for example, the resource feed(s) 506 may include one or more systems or services for providing virtual applications and/or desktops to the client(s) 226, one or more file repositories and/or file sharing systems, one or more secure browser services, one or more access control services for the SaaS applications 510, one or more management services for local applications on the client(s) 226, one or more internet enabled devices or sensors, etc. Each of the resource management service(s) 502, the resource feed(s) 506, the gateway service(s) 508, the SaaS application(s) 510, and the identity provider 512 may be located within an on-premises data center of an organization for which the system 500 is deployed, within one or more cloud computing environments, or elsewhere.

Figure 5B:
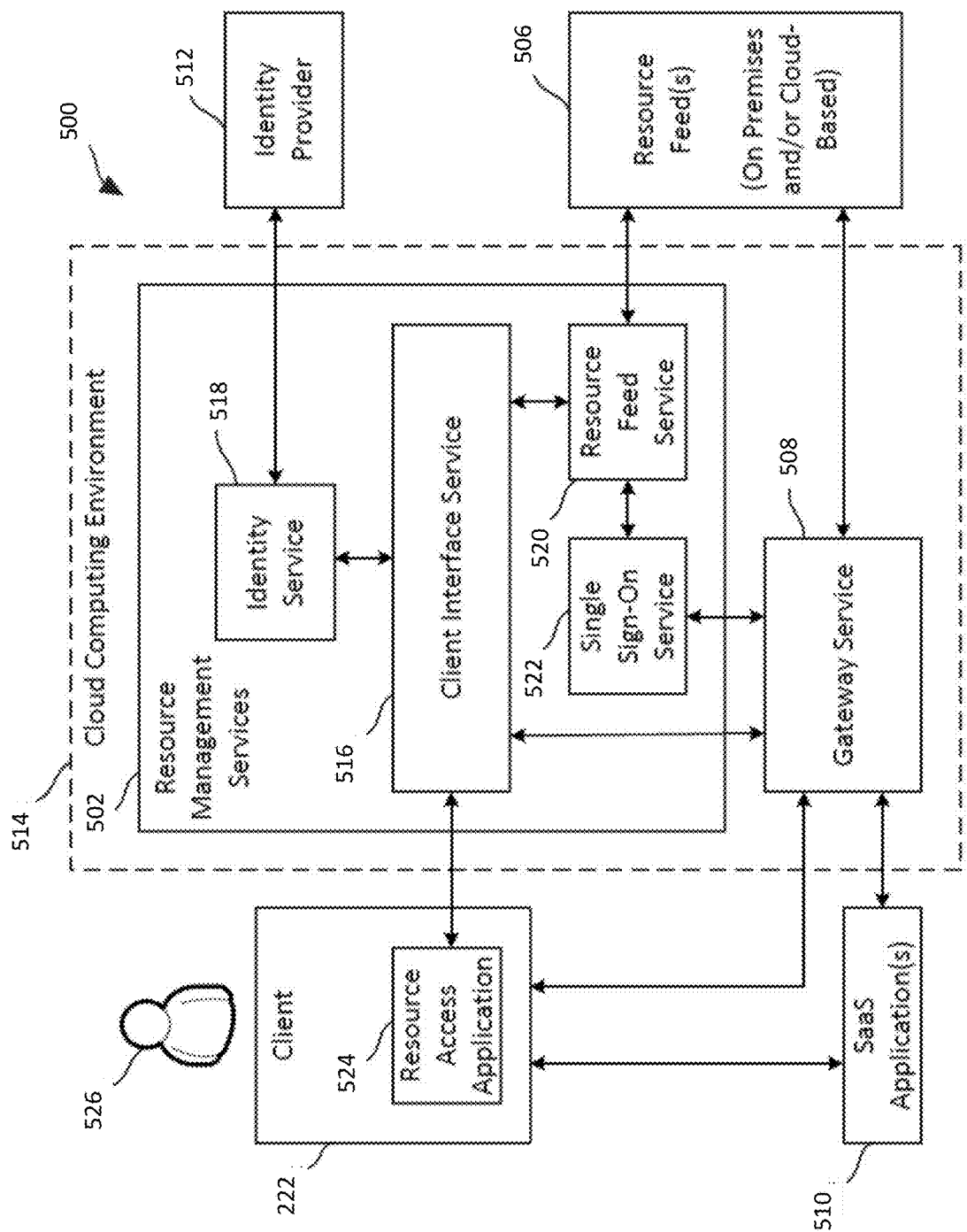
FIG. 5B is a block diagram showing an example implementation of the system shown in FIG. 5A in which various resource management services as well as a gateway service are located within a cloud computing environment.

FIG. 5B is a block diagram showing an example implementation of the system 500 shown in FIG. 5A in which various resource management services 502 as well as a gateway service 508 are located within a cloud computing environment 514. The cloud computing environment may, for example, include Microsoft Azure Cloud, Amazon Web Services, Google Cloud, or IBM Cloud.

For any of illustrated components (other than the client 222) that are not based within the cloud computing environment 514, cloud connectors (not shown in FIG. 5B) may be used to interface those components with the cloud computing environment 514. Such cloud connectors may, for example, run on Windows Server instances hosted in resource locations and may create a reverse proxy to route traffic between the site(s) and the cloud computing environment 514. In the illustrated example, the cloud-based resource management services 502 include a client interface service 516, an identity service 518, a resource feed service 520, and a single sign-on service 522. As shown, in some embodiments, the client 222 may use a resource access application 524 to communicate with the client interface service 516 as well as to present a user interface on the client 222 that a user 526 can operate to access the resource feed(s) 506 and/or the SaaS application(s) 510. The resource access application 524 may either be installed on the client 222, or may be executed by the client interface service 516 (or elsewhere in the system 500) and accessed using a web browser (not shown in FIG. 5B) on the client 222.

As explained in more detail below, in some embodiments, the resource access application 524 and associated components may provide the user 526 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 524 is launched or otherwise accessed by the user 526, the client interface service 516 may send a sign-on request to the identity service 518. In some embodiments, the identity provider 512 may be located on the premises of the organization for which the system 500 is deployed. The identity provider 512 may, for example, correspond to an on-premises Windows Active Directory. In such embodiments, the identity provider 512 may be connected to the cloud-based identity service 518 using a cloud connector (not shown in FIG. 5B), as described above. Upon receiving a sign-on request, the identity service 518 may cause the resource access application 524 (via the client interface service 516) to prompt the user 526 for the user's authentication credentials (e.g., user-name and password). Upon receiving the user's authentication credentials, the client interface service 516 may pass the credentials along to the identity service 518, and the identity service 518 may, in turn, forward them to the identity provider 512 for authentication, for example, by comparing them against an Active Directory domain. Once the identity service 518 receives confirmation from the identity provider 512 that the user's identity has been properly authenticated, the client interface service 516 may send a request to the resource feed service 520 for a list of subscribed resources for the user 526.

In other embodiments (not illustrated in FIG. 5B), the identity provider 512 may be a cloud-based identity service, such as a Microsoft Azure Active Directory. In such embodiments, upon receiving a sign-on request from the client interface service 516, the identity service 518 may, via the client interface service 516, cause the client 222 to be redirected to the cloud-based identity service to complete an authentication process. The cloud-based identity service may then cause the client 222 to prompt the user 526 to enter the user's authentication credentials. Upon determining the user's identity has been properly authenticated, the cloud-based identity service may send a message to the resource access application 524 indicating the authentication attempt was successful, and the resource access application 524 may then inform the client interface service 516 of the successfully authentication. Once the identity service 518 receives confirmation from the client interface service 516 that the user's identity has been properly authenticated, the client interface service 516 may send a request to the resource feed service 520 for a list of subscribed resources for the user 526.

For each configured resource feed, the resource feed service 520 may request an identity token from the single sign-on service 522. The resource feed service 520 may then pass the feed-specific identity tokens it receives to the points of authentication for the respective resource feeds 506. Each resource feed 506 may then respond with a list of resources configured for the respective identity. The resource feed service 520 may then aggregate all items from the different feeds and forward them to the client interface service 516, which may cause the resource access application 524 to present a list of available resources on a user interface of the client 222. The list of available resources may, for example, be presented on the user interface of the client 222 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 222, and/or one or more SaaS applications 510 to which the user 526 has subscribed. The lists of local applications and the SaaS applications 510 may, for example, be supplied by resource feeds 506 for respective services that manage which such applications are to be made available to the user 526 via the resource access application 524. Examples of SaaS applications 510 that may be managed and accessed as described herein include Microsoft Office 365 applications, SAP SaaS applications, Workday applications, etc.

For resources other than local applications and the SaaS application(s) 510, upon the user 526 selecting one of the listed available resources, the resource access application 524 may cause the client interface service 516 to forward a request for the specified resource to the resource feed service 520. In response to receiving such a request, the resource feed service 520 may request an identity token for the corresponding feed from the single sign-on service 522. The resource feed service 520 may then pass the identity token received from the single sign-on service 522 to the client interface service 516 where a launch ticket for the resource may be generated and sent to the resource access application 524. Upon receiving the launch ticket, the resource access application 524 may initiate a secure session to the gateway service 508 and present the launch ticket. When the gateway service 508 is presented with the launch ticket, it may initiate a secure session to the appropriate resource feed and present the identity token to that feed to seamlessly authenticate the user 526. Once the session initializes, the client 222 may proceed to access the selected resource.

When the user 526 selects a local application, the resource access application 524 may cause the selected local application to launch on the client 222. When the user 526 selects a SaaS application 510, the resource access application 524 may cause the client interface service 516 request a one-time uniform resource locator (URL) from the gateway service 508 as well a preferred browser for use in accessing the SaaS application 510. After the gateway service 508 returns the one-time URL and identifies the preferred browser, the client interface service 516 may pass that information along to the resource access application 524. The client 222 may then launch the identified browser and initiate a connection to the gateway service 508. The gateway service 508 may then request an assertion from the single sign-on service 522. Upon receiving the assertion, the gateway service 508 may cause the identified browser on the client 222 to be redirected to the logon page for identified SaaS application 510 and present the assertion. The SaaS may then contact the gateway service 508 to validate the assertion and authenticate the user 526. Once the user has been authenticated, communication may occur directly between the identified browser and the selected SaaS application 510, thus allowing the user 526 to use the client 222 to access the selected SaaS application 510.

In some embodiments, the preferred browser identified by the gateway service 508 may be a specialized browser embedded in the resource access application 524 (when the resource application is installed on the client 222) or provided by one of the resource feeds 506 (when the resource application 524 is located remotely), e.g., via a secure browser service. In such embodiments, the SaaS applications 510 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 222 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 506) for assessment of its security risk by a web filtering service. For approved URLs, the specialized browser may be permitted to access the link. For suspicious links, however, the web filtering service may have the client interface service 516 send the link to a secure browser service, which may start a new virtual browser session with the client 222, and thus allow the user to access the potentially harmful linked content in a safe environment.

In some embodiments, in addition to or in lieu of providing the user 526 with a list of resources that are available to be accessed individually, as described above, the user 526 may instead be permitted to choose to access a streamlined feed of event notifications and/or available actions that may be taken with respect to events that are automatically detected with respect to one or more of the resources. This streamlined resource activity feed, which may be customized for each user 526, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 222 to notify a user 526 of something that requires the user's attention (e.g., approval of an expense report, new course available for registration, etc.).

Figure 5C:
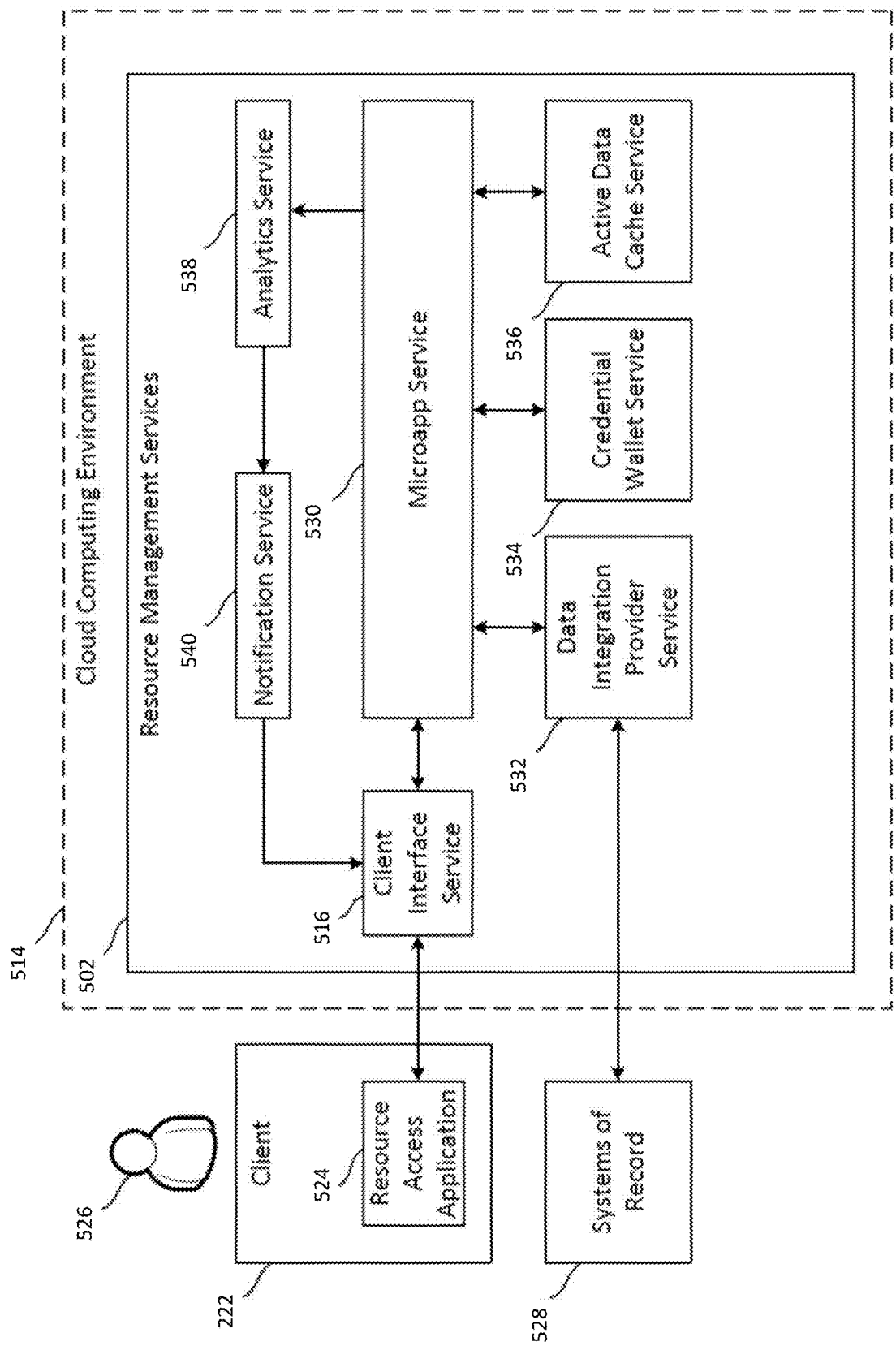
FIG. 5C is a block diagram similar to that shown in FIG. 5B but in which the available resources are represented by a single box labeled "systems of record," and further in which several different services are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 528 labeled "systems of record," and further in which several different services are included within the resource management services block 502. As explained below, the services shown in FIG. 5C may enable the provision of a streamlined resource activity feed and/or notification process for a client 222. In the example shown, in addition to the client interface service 516 discussed above, the illustrated services include a microapp service 530, a data integration provider service 532, a credential wallet service 534, an active data cache service 536, an analytics service 538, and a notification service 540. In various embodiments, the services shown in FIG. 5C may be employed either in addition to or instead of the different services shown in FIG. 5B.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 524 without having to launch the native application. The system shown in FIG. 5C may, for example, aggregate relevant notifications, tasks, and insights, and thereby give the user 526 a dynamic productivity tool. In some embodiments, the resource activity feed may be intelligently populated by utilizing machine learning and artificial intelligence (AI) algorithms. Further, in some implementations, microapps may be configured within the cloud computing environment 514, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 528 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 532, may, for example, support REST API, JSON, OData-JSON, and 6ML. As explained in more detail below, the data integration provider service 532 may also write back to the systems of record, for example, using OAuth2 or a service account.

In some embodiments, the microapp service 530 may be a single-tenant service responsible for creating the microapps. The microapp service 530 may send raw events, pulled from the systems of record 528, to the analytics service 538 for processing. The microapp service may, for example, periodically pull active data from the systems of record 528.

In some embodiments, the active data cache service 536 may be single-tenant and may store all configuration information and microapp data. It may, for example, utilize a per-tenant database encryption key and per-tenant database credentials.

In some embodiments, the credential wallet service 534 may store encrypted service credentials for the systems of record 528 and user OAuth2 tokens.

In some embodiments, the data integration provider service 532 may interact with the systems of record 528 to decrypt end-user credentials and write back actions to the systems of record 528 under the identity of the end-user. The write-back actions may, for example, utilize a user's actual account to ensure all actions performed are compliant with data policies of the application or other resource being interacted with.

In some embodiments, the analytics service 538 may process the raw events received from the microapps service 530 to create targeted scored notifications and send such notifications to the notification service 540.

Finally, in some embodiments, the notification service 540 may process any notifications it receives from the analytics service 538. In some implementations, the notification service 540 may store the notifications in a database to be later served in a notification feed. In other embodiments, the notification service 540 may additionally or alternatively send the notifications out immediately to the client 222 as a push notification to the user 526.

In some embodiments, a process for synchronizing with the systems of record 528 and generating notifications may operate as follows. The microapp service 530 may retrieve encrypted service account credentials for the systems of record 528 from the credential wallet service 534 and request a sync with the data integration provider service 532. The data integration provider service 532 may then decrypt the service account credentials and use those credentials to retrieve data from the systems of record 528. The data integration provider service 532 may then stream the retrieved data to the microapp service 530. The microapp service 530 may store the received systems of record data in the active data cache service 536 and also send raw events to the analytics service 538. The analytics service 538 may create targeted scored notifications and send such notifications to the notification service 540. The notification service 540 may store the notifications in a database to be later served in a notification feed and/or may send the notifications out immediately to the client 222 as a push notification to the user 526.

In some embodiments, a process for processing a user-initiated action via a microapp may operate as follows. The client 222 may receive data from the microapp service 530 (via the client interface service 516) to render information corresponding to the microapp. The microapp service 530 may receive data from the active data cache service 536 to support that rendering. The user 526 may invoke an action from the microapp, causing the resource access application 524 to send that action to the microapp service 530 (via the client interface service 516). The microapp service 530 may then retrieve from the credential wallet service 534 an encrypted Oauth2 token for the system of record for which the action is to be invoked, and may send the action to the data integration provider service 532 together with the encrypted Oath2 token. The data integration provider service 532 may then decrypt the Oath2 token and write the action to the appropriate system of record under the identity of the user 526. The data integration provider service 532 may then read back changed data from the written-to system of record and send that changed data to the microapp service 530. The microapp service 532 may then update the active data cache service 536 with the updated data and cause a message to be sent to the resource access application 524 (via the client interface service 516) notifying the user 526 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant"

and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistance through either the resource access application 524 or directly from another resource, such as Microsoft Teams. This feature may allow employees to work efficiently, stay organized, and deliver only the specific information they're looking for.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

It will be further understood that various changes in the details, materials, and arrangements of the parts that have been described and illustrated herein may be made by those skilled in the art without departing from the scope of the following claims.

What is claimed is:

1. A method, comprising:
   receiving, by one or more processors from an application executing on one or more servers, data about a sequence of tasks to be performed by a plurality of users using a plurality of client devices;
   identifying, by the one or more processors, a first user from the plurality of users to perform a first task in the sequence of tasks, and a second user from the plurality of users to perform a second task in the sequence of tasks that is subsequent to the first task;
   determining, by the one or more processors, a state of a first client device associated with the first user and a state of a second client device associated with the second user, wherein the state of the first client device indicates whether the first client device is ready to perform tasks, and the state of the second client device indicates whether the second client device is ready to perform tasks;
   establishing, by the one or more processors, a rank for the first task for the first user based on the state of the first client device and the state of the second client device; and
   providing, by the one or more processors to the first client device, data comprising the rank for the first task and information about the state of the second client device to cause the first client device to generate a graphical user interface that indicates the rank of the first task and an indication of the state of the second client device.

2. The method of claim 1, wherein the application is executed by a virtual machine executing on the one or more servers.

3. The method of claim 1, comprising:
   receiving, by the one or more processors, an updated state for the second client device;
   establishing, by the one or more processors, a second rank for the first task for the first user based on the updated state for the second client device; and
   providing, by the one or more processors to the first client device, an indication of the second rank for the first task to cause the first client device to re-rank the first task in the graphical user interface based on the second rank.

4. The method of claim 1, comprising:
   identifying, by the one or more processors, a third task in the sequence of tasks and a third user associated with a third client device to perform the third task, wherein the third task is subsequent to the second task;
   determining, by the one or more processors, a state of the third client device; and
   establishing, by the one or more processors, the rank for the first task for the first user based on both the state of the second client device and the state of the third client device.

5. The method of claim 1, wherein the state of the second client device corresponds to a ready state, comprising:
   determining, by the one or more processors, an amount of time the second client device has been in the ready state; and
   establishing, by the one or more processors, the rank for the first task for the first user based on the state of the first client device, the state of the second client device, and the amount of time the second client device has been in the ready state.

6. The method of claim 1, wherein the state of the second client device corresponds to a ready state, comprising:
   determining, by the one or more processors, an amount of time the second client device has been in the ready state; and
   providing, by the one or more processors, an instruction to the first client device to update the graphical user interface to indicate the amount of time the second client device has been in the ready state.

7. The method of claim 1, comprising:
   determining, by the one or more processors, an amount of time the second client device has been in the state; and
   invoking, by the one or more processors, a digital assistant to perform the first task on behalf of the first user responsive to the amount of time satisfying a threshold.

8. The method of claim 1, comprising:
   receiving, by the one or more processors, an indication of completion of the first task by the first user;
   receiving, by the one or more processors, an updated state of the first client device that previously completed the first task; and
   providing, by the one or more processors to the second client device, information comprising the second task and the updated state of the first client device to cause the second client device to generate a graphical user interface displaying the second task and the updated state of the first client device.

9. The method of claim 1, comprising:
   providing, by the one or more processors to the second client device, responsive to completion of the first task by the first user, information comprising the second task and an updated state of the first client device to cause the second client device to generate a graphical user interface displaying the second task, the updated state of the first client device, and a communication icon configured to establish a communication channel between the second client device and the first client device;

receiving, by the one or more processors, a request to establish the communication channel between the second client device and the first client device that previously performed the first task; and establishing, by the one or more processors, the communication channel responsive to the request.

10. The method of claim 1, comprising:

identifying, by the one or more processors, a third task of the sequence of tasks and a third user associated with a third client device of the plurality of client devices assigned to perform the third task, wherein the third task is subsequent to the second task;

retrieving, by the one or more processors subsequent to completion of the second task, the state of the first client device, the state of the second client device, information associated with performance of the first task by the first user, and information associated with performance of the second task by the second user; and providing, by the one or more processors to the third client device, a graphical user interface card configured to display the state of the first client device, the state of the second client device, the information associated with performance of the first task by the first user, the information associated with performance of the second task by the second user, and an icon configured to initiate a communication channel between the third client device and at least one of the first client device or the second client device.

11. A system, comprising:

one or more processors and memory configured to:

receive, from an application executed by one or more servers, data about a sequence of tasks to be performed by a plurality of users using a plurality of client devices;

identify a first user from the plurality of users to perform a first task in the sequence of tasks, and a second user from the plurality of users to perform a second task in the sequence of tasks that is subsequent to the first task;

determine a state of a first client device associated with the first user and a state of a second client device associated with the second user, wherein the state of the first client device indicates whether the first client device is ready to perform tasks, and the state of the second client device indicates whether the second client device is ready to perform tasks;

establish a rank for the first task for the first user based on the state of the first client device and the state of the second client device; and provide, to the first client device, data comprising the rank for the first task and information about the state of the second client device to cause the first client device to generate a graphical user interface that indicates the rank of the first task and an indication of the state of the second client device.

12. The system of claim 11, wherein the application is executed by a virtual machine executing on the one or more servers.

13. The system of claim 11, wherein the one or more processors are further configured to:

receive an updated state for the second client device;

establish a second rank for the first task for the first user based on the updated state for the second client device; and provide, to the first client device, an indication of the second rank for the first task to cause the first client device to re-rank the first task in the graphical user interface based on the second rank.

14. The system of claim 11, wherein the one or more processors are further configured to:

identify a third task in the sequence of tasks and a third user associated with a third client device to perform the third task, wherein the third task is subsequent to the second task;

determine a state of the third client device; and establish the rank for the first task for the first user based on both the state of the second client device and the state of the third client device.

15. The system of claim 11, wherein the state of the second client device corresponds to a ready state, and the one or more processors are further configured to:

determine an amount of time the second client device has been in the ready state; and establish the rank for the first task for the first user based on the state of the first client device, the state of the second client device, and the amount of time the second client device has been in the ready state.

16. The system of claim 11, wherein the one or more processors are further configured to:

determine an amount of time the second client device has been in the state; and invoke a digital assistant to perform the first task on behalf of the first client device responsive to the amount of time satisfying a threshold.

17. The system of claim 11, wherein the one or more processors are further configured to:

receive an indication of completion of the first task by the first user;

receive an updated state of the first client device;

provide, to the second client device, information comprising the second task and the updated state of the first client device to cause the second client device to generate a graphical user interface displaying the second task and the updated state of the first client device.

18. The system of claim 11, wherein the one or more processors are further configured to:

provide, to the second client device, responsive to completion of the first task by the first user, information comprising the second task and an updated state of the first client device to cause the second client device to generate a graphical user interface displaying the second task, the updated state of the first client device, and a communication icon configured to establish a communication channel between the second client device and the first client device;

receive a request to establish the communication channel between the second client device and the first client device that performed the first task; and establish the communication channel responsive to the request.

19. The system of claim 11, wherein the one or more processors are further configured to:

identify a third task of the sequence of tasks and a third user associated with a third client device of the plurality of client devices assigned to perform the third task, wherein the third task is subsequent to the second task;

retrieve, subsequent to completion of the second task, the state of the first client device, the state of the second client device, information associated with performance of the first task by the first user, and information associated with performance of the second task by the second user; and provide, to the third client device, a graphical user interface card configured to display the state of the first client device, the state of the second client device, the information associated with performance of the first task by the first user, the information associated with performance of the second task by the second user, and an icon configured to initiate a communication channel between the third client device and at least one of the first client device or the second client device.

20. A computer-readable medium storing web browser executable instructions that, when executed by the web browser, cause one or more servers to provide a digital service to perform tasks, the instructions comprising instructions to:

provide, to one or more processors, an indication of a state of a first client device associated with a first user, wherein the one or more processors are configured to:

receive, from an application executing on a server, data about a sequence of tasks to be performed by a plurality of users using a plurality of client devices;

identify the first user from the plurality of users to perform a first task in the sequence of tasks, and a second user from the plurality of users to perform a second task in the sequence of tasks that is subsequent to the first task;

determine the state of the first client device associated with the first user and a state of a second client device associated with the second user, wherein the state of the first client device indicates whether the first client device is ready to perform tasks, and the state of the second client device indicates whether the second client device is ready to perform tasks;

establish a rank for the first task for the first user based on the state of the first client device and the state of the second client device;

provide, to the first client device, data comprising the rank for the first task and information about the state of the second client device; and generate a graphical user interface that indicates the rank of the first task and an indication of the state of the second client device.

\* \* \* \* \*